United States Patent
Taniguchi et al.

(10) Patent No.: US 11,891,957 B2
(45) Date of Patent: Feb. 6, 2024

(54) EXIT SEAL AND GAS TURBINE EQUIPPED WITH SAME

(71) Applicant: MITSUBISHI HEAVY INDUSTRIES, LTD., Tokyo (JP)

(72) Inventors: Kenta Taniguchi, Yokohama (JP); Taiki Kinoshita, Yokohama (JP); Hiroyuki Sakaki, Yokohama (JP); Kentaro Tokuyama, Yokohama (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/790,315

(22) PCT Filed: Feb. 8, 2021

(86) PCT No.: PCT/JP2021/004530
§ 371 (c)(1),
(2) Date: Jun. 30, 2022

(87) PCT Pub. No.: WO2021/166710
PCT Pub. Date: Aug. 26, 2021

(65) Prior Publication Data
US 2023/0042434 A1  Feb. 9, 2023

(30) Foreign Application Priority Data
Feb. 18, 2020 (JP) ................. 2020-025581

(51) Int. Cl.
*F01D 25/24* (2006.01)
*F02C 7/28* (2006.01)
*F23R 3/42* (2006.01)

(52) U.S. Cl.
CPC .............. *F02C 7/28* (2013.01); *F01D 25/243* (2013.01); *F23R 3/42* (2013.01); *F05D 2220/32* (2013.01); *F05D 2240/55* (2013.01)

(58) Field of Classification Search
CPC .. F01D 25/243; F23R 3/42; F02C 7/28; F05D 2220/32; F05D 2240/55
See application file for complete search history.

(56) References Cited

U.S. PATENT DOCUMENTS 10,816,198 B2 * 10/2020 Fujisawa ................. F23R 3/002
2005/0241314 A1   11/2005 Takaya et al.
(Continued)

FOREIGN PATENT DOCUMENTS

| JP | 2005-30680 | 2/2005 |
| JP | 2008-31870 | 2/2008 |

(Continued)

OTHER PUBLICATIONS

International Search Report dated Apr. 6, 2021 in corresponding International Application No. PCT/JP2021/004530, with English language translation.

(Continued)

*Primary Examiner* — Eric J Zamora Alvarez
*Assistant Examiner* — Theodore C Ribadeneyra
(74) *Attorney, Agent, or Firm* — Wenderoth, Lind & Ponack, L.L.P.

(57) ABSTRACT

This exit seal is for connecting an exit flange of a combustor and a shroud in a stator blade of a turbine. The exit seal is equipped with: a seal body that extends in a circumferential direction; and a lid member disposed at a circumferential end of the seal body. The seal body comprises one or more recessed sections that are recessed in a radial direction or in an axial direction and extend in the circumferential direction. At a position of the circumferential end of at least one recessed section among the one or more recessed sections, the lid member is disposed so as to overlap, in the axial direction and the radial direction, with a recessed space formed by the one recessed section.

18 Claims, 10 Drawing Sheets

(56) References Cited

U.S. PATENT DOCUMENTS

| | | | |
|---|---|---|---|
| 2008/0010989 A1* | 1/2008 | Kato | F23R 3/42 |
| | | | 60/752 |
| 2011/0140370 A1 | 6/2011 | Sutcu | |
| 2016/0194981 A1* | 7/2016 | Drake | F23R 3/002 |
| | | | 60/722 |
| 2016/0273374 A1* | 9/2016 | Mitchell | F16J 15/32 |
| 2017/0183971 A1 | 6/2017 | McDufford et al. | |
| 2017/0284218 A1 | 10/2017 | Kondo et al. | |
| 2018/0058331 A1 | 3/2018 | Barton et al. | |
| 2018/0347385 A1 | 12/2018 | Kishida et al. | |

FOREIGN PATENT DOCUMENTS

| | | | |
|---|---|---|---|
| JP | 2013-221455 | | 10/2013 |
| JP | 2013221455 A | * | 10/2013 |
| JP | 2016-70081 | | 5/2016 |
| JP | 2017-53252 | | 3/2017 |
| JP | 2017-120085 | | 7/2017 |
| JP | 2018-59502 | | 4/2018 |

OTHER PUBLICATIONS

Written Opinion of the International Searching Authority dated Apr. 6, 2021 in corresponding International Application No. PCT/JP2021/004530, with English language translation.
Office Action dated Mar. 13, 2020 in corresponding Japanese Patent Application No. 2020-025581, With English language translation.

* cited by examiner

FIG. 5
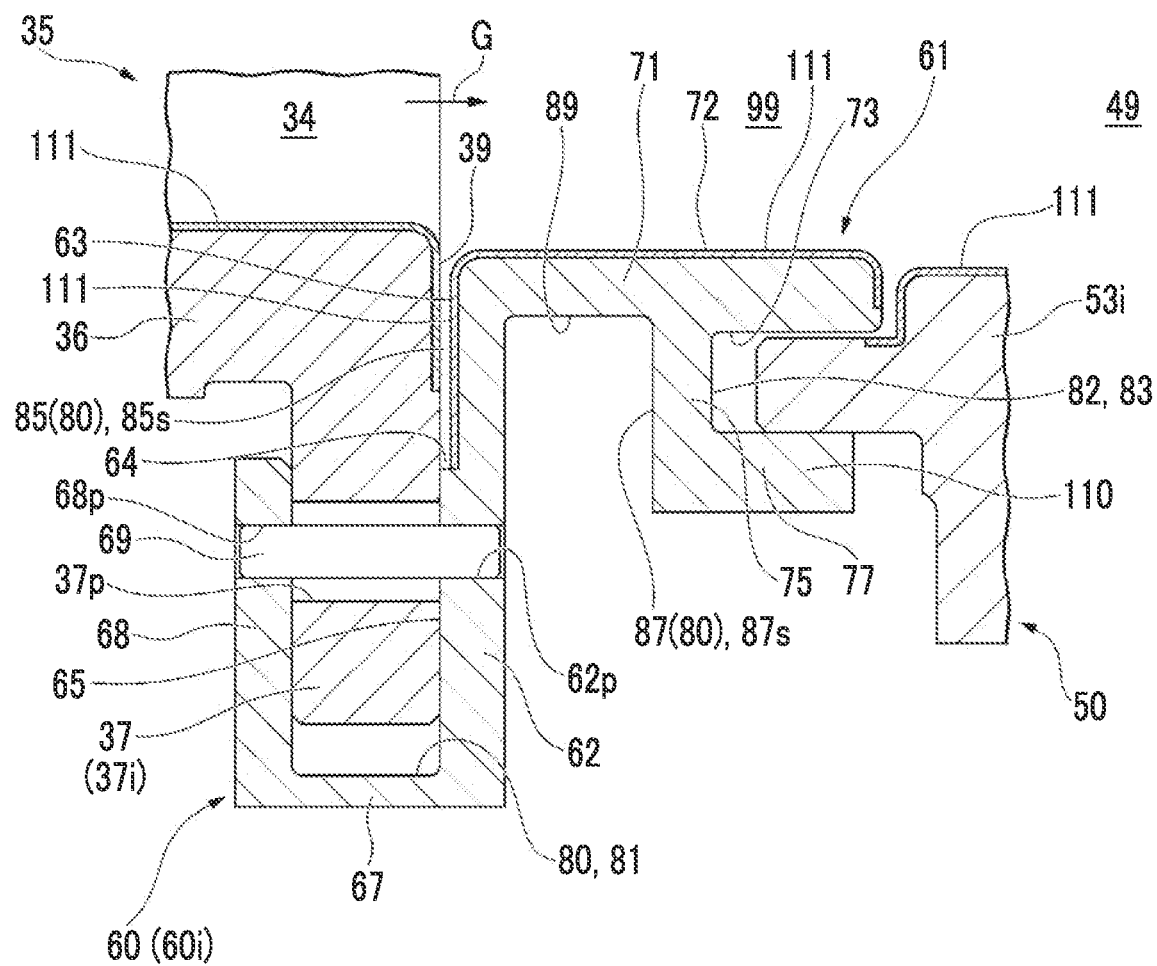
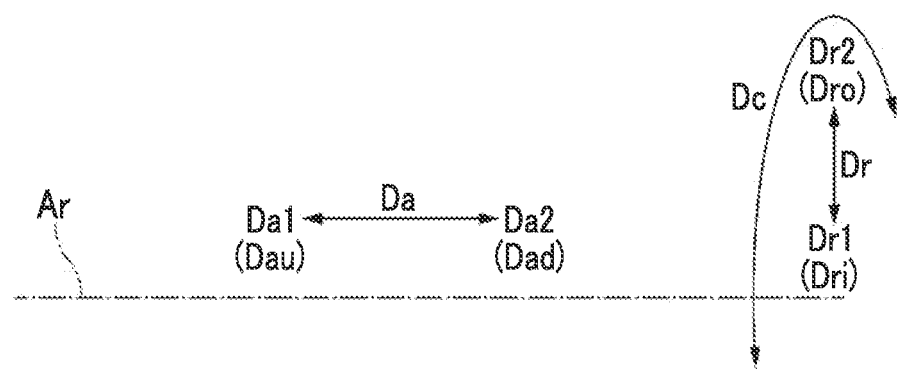

FIG. 6
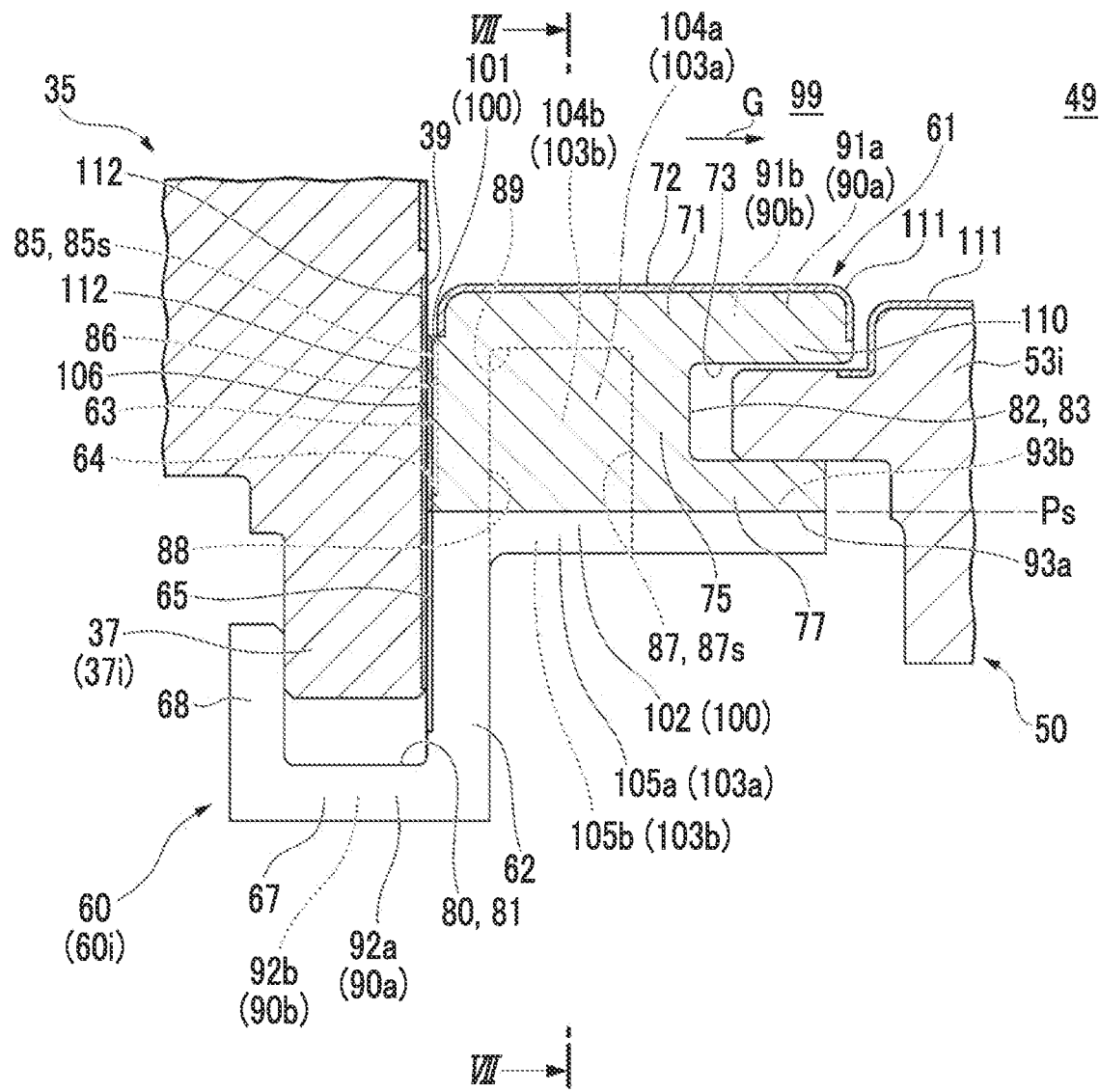
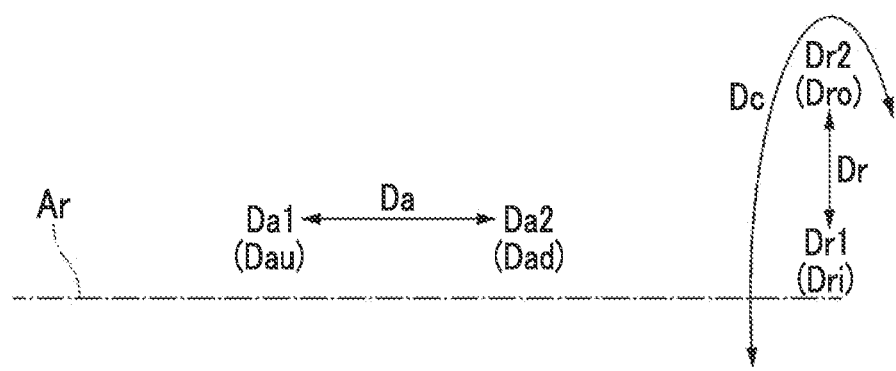

FIG. 9
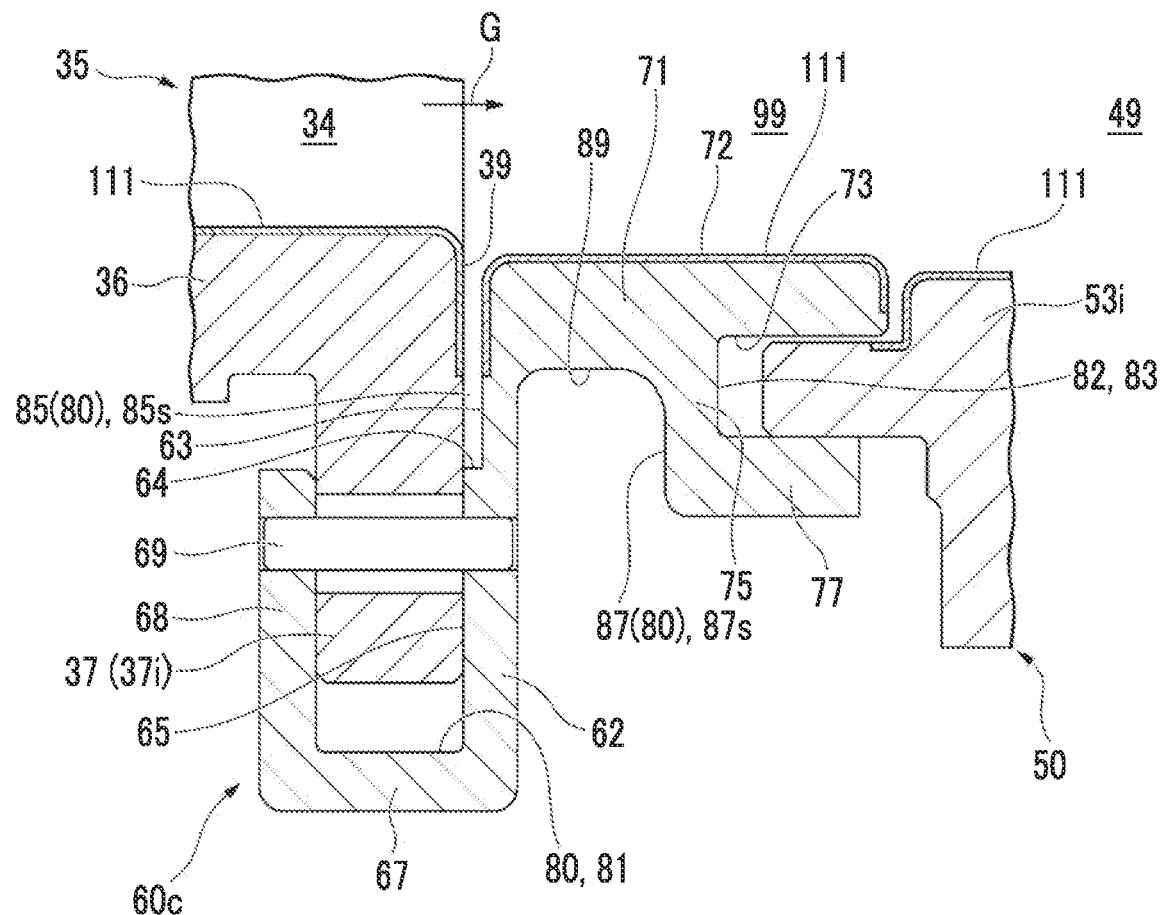
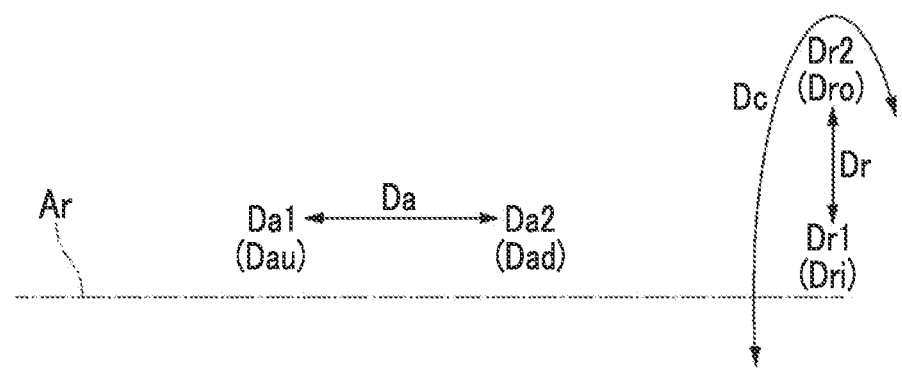

FIG. 10
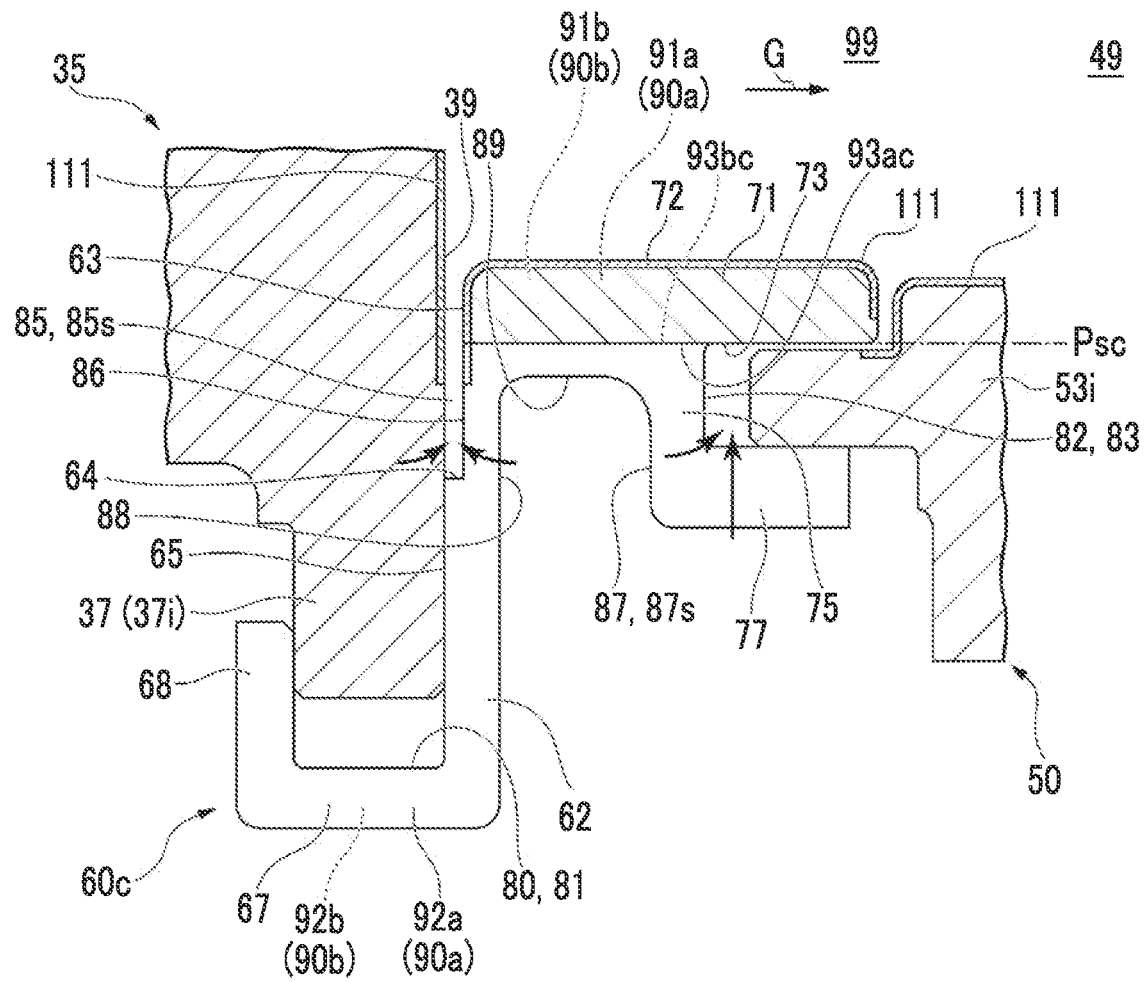
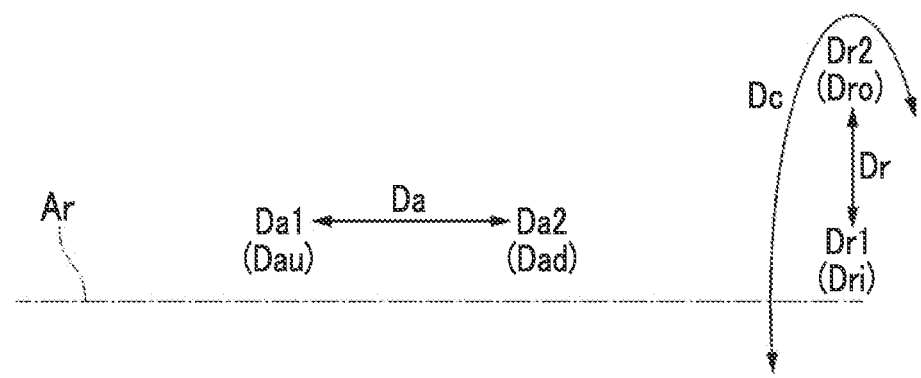

EXIT SEAL AND GAS TURBINE EQUIPPED WITH SAME

TECHNICAL FIELD

The present disclosure relates to an outlet seal that connects an outlet flange of a combustor and a shroud of a stator vane of a turbine, and a gas turbine provided with the same.

Priority is claimed on Japanese Patent Application No. 2020-025581, filed Feb. 18, 2020, the content of which is incorporated herein by reference.

BACKGROUND ART

A gas turbine includes a compressor that compresses air to generate compressed air; a combustor that combusts fuel in the compressed air to generate combustion gas; a turbine that is driven by the combustion gas; and an intermediate casing. The compressor includes a compressor rotor that rotates around an axis, and a compressor casing that covers the compressor rotor. The combustor includes a burner that sprays the fuel, and a combustion tube that delivers the combustion gas generated by the combustion of the fuel, to the turbine. The turbine includes a turbine rotor that rotates around an axis; a turbine casing that covers the turbine rotor; and a plurality of stator vane rows. The turbine rotor includes a rotor shaft around the axis, and a plurality of rotor blade rows attached to the rotor shaft. The plurality of rotor blade rows are arranged in an axial direction where the axis extends. Each of the rotor blade rows includes a plurality of rotor blades arranged in a circumferential direction with respect to the axis. The plurality of stator vane rows are arranged in the axial direction, and are attached to an inner peripheral side of the turbine casing. Each of the plurality of stator vane rows is disposed on an axial upstream side of one rotor blade row of the plurality of rotor blade rows. Each of the stator vane rows also includes a plurality of stator vanes arranged in the circumferential direction with respect to the axis.

The compressor casing and the turbine casing are connected via the intermediate casing. The combustor is attached to the intermediate casing. The combustion tube of the combustor is disposed inside the intermediate casing. The compressed air from the compressor is discharged into the intermediate casing. The compressed air flows into the combustor and is used for the combustion of the fuel.

Shrouds of first stage stator vanes forming a stator vane row located on a most axial upstream side among the plurality of stator vane rows, and an outlet flange of the combustor are connected by an outlet seal (or a combustion tube seal).

PTL 1 below discloses an outlet seal. The outlet seal includes a combustor connecting portion to which the outlet flange of the combustor is connected, and a stator vane connecting portion to which the shrouds of the first stage stator vanes are connected. The outlet seal defines a part of a combustion gas flow path through which the combustion gas from the combustor flows.

CITATION LIST

Patent Literature

[PTL 1] Japanese Unexamined Patent Application Publication No. 2013-221455

SUMMARY OF INVENTION

Technical Problem

From the viewpoint of efficiency of the gas turbine, it is desirable to reduce the amount of leakage of compressed air inside an intermediate casing into a combustion gas flow path along an outer surface of the outlet seal.

Therefore, an object of the present disclosure is to provide an outlet seal capable of suppressing the amount of leakage of compressed air into a combustion gas flow path, and a gas turbine provided with the same.

Solution to Problem

According to one aspect of the disclosure to achieve the above object, there is provided an outlet seal that connects an outlet flange of a combustor and a shroud of a stator vane of a turbine, the seal including: a seal body extending in a circumferential direction with respect to an axis; and a lid member provided at an end of the seal body in the circumferential direction to extend in an axial direction in which the axis extends and in a radial direction with respect to the axis. The seal body includes a combustor connecting portion that is formed on an axial first side of the seal body and that is connected to the outlet flange, the axial first side being one side in the axial direction, a stator vane connecting portion that is formed on an axial second side of the seal body and that is connected to the shroud, the axial second side being the other side in the axial direction, and one or more recessed portions recessed in the radial direction or in the axial direction and extending in the circumferential direction. The lid member is disposed at a position of an end of at least one recessed portion of the one or more recessed portions in the circumferential direction to overlap a recessed space in the axial direction and in the radial direction, the recessed space being formed by the one recessed portion.

In this aspect, since the lid member is disposed at the end of the recessed portion in the circumferential direction, it is possible to suppress the amount of compressed air entering the recessed space from the end of the recessed portion in the circumferential direction and exiting therefrom. For this reason, in this aspect, it is possible to suppress the amount of leakage by which the compressed air existing on a radial first side of the outlet seal flows into a combustion gas flow path through the recessed space of the recessed portion.

According to one aspect of the disclosure to achieve the above object, there is provided a gas turbine including: the outlet seal according to the above aspect; the combustor; and the turbine. The combustor includes a combustion tube extending in a direction including a directional component of the axial direction, a burner that sprays fuel into a combustion space that is a space on an inner peripheral side of the combustion tube, and the outlet flange extending from an end on the axial second side of the combustion tube in the radial direction. The turbine includes a turbine rotor that rotates around the axis, a turbine casing covering the turbine rotor, and a plurality of stator vane rows attached to the turbine casing. The turbine rotor includes a rotor shaft around the axis and a plurality of rotor blade rows attached to the rotor shaft. The plurality of rotor blade rows are arranged in the axial direction. Each of the plurality of stator vane rows is disposed on the axial first side with respect to one rotor blade row of the plurality of rotor blade rows. Each of the plurality of stator vane rows includes a plurality of stator vanes arranged in the circumferential direction. Each of the plurality of stator vanes includes a vane body extending in the radial direction and a shroud formed at an end of the vane body in the radial direction. The outlet seal connects the outlet flange of the combustion tube and a shroud of a first stage stator vane provided in a first stage stator vane row on a most axial first side among the plurality of stator vane rows.

Advantageous Effects of Invention

According to the outlet seal of one aspect of the present disclosure, it is possible to suppress the amount of leakage of the compressed air into the combustion gas flow path.

BRIEF DESCRIPTION OF DRAWINGS

FIG. 5 is a cross-sectional view taken along line V-V in FIG. 3.

FIG. 6 is a cross-sectional view taken along line VI-VI in FIG. 3.

FIG. 9 is a cross-sectional view of the outlet seal in the comparative example (cross-sectional view corresponding to the cross-sectional view taken along line V-V in FIG. 3).

FIG. 10 is a cross-sectional view of the outlet seal in the comparative example taken at another position (cross-sectional view corresponding to the cross-sectional view taken along line VI-VI in FIG. 3).

DESCRIPTION OF EMBODIMENTS

Hereinafter, an embodiment of the present disclosure will be described in detail with reference to the drawings.

[Embodiment of Gas Turbine]

An embodiment of a gas turbine will be described with reference to FIGS. 1 to 3.

Figure 1:
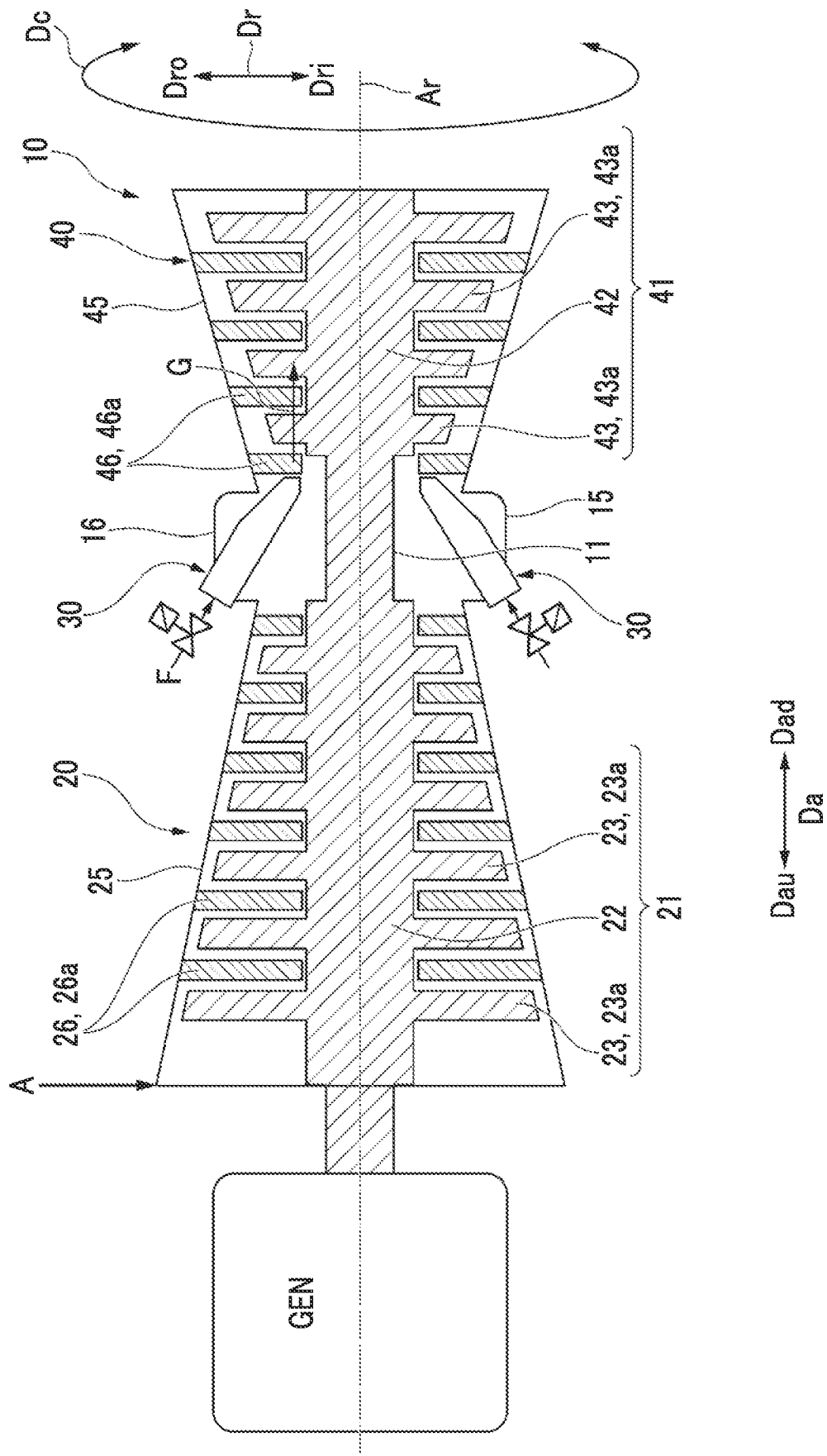
FIG. 1 is a schematic cross-sectional view of a gas turbine according to one embodiment of the present disclosure.

As illustrated in FIG. 1, a gas turbine 10 of the present embodiment includes a compressor 20 that compresses air A; a plurality of combustors 30 that combust fuel F in the air A compressed by the compressor 20, to generate combustion gas G; and a turbine 40 that is driven by the combustion gas G.

The compressor 20 includes a compressor rotor 21 that rotates around an axis Ar; a compressor casing 25 that covers the compressor rotor 21; and a plurality of stator vane rows 26. The turbine 40 includes a turbine rotor 41 that rotates around the axis Ar; a turbine casing 45 that covers the turbine rotor 41; and a plurality of stator vane rows 46. Hereinafter, a direction in which the axis Ar extends is referred to as an axial direction Da, a circumferential direction around the axis Ar is simply referred to as a circumferential direction Dc, and a direction perpendicular to the axis Ar is referred to as a radial direction Dr. In addition, one side in the axial direction Da is referred to as an axial upstream side Dau, and an opposite side is referred to as an axial downstream side Dad. In addition, a side approaching the axis Ar in the radial direction Dr is referred to as a radial inner side Dri, and an opposite side is referred to as a radial outer side Dro.

The compressor 20 is disposed on the axial upstream side Dau with respect to the turbine 40.

The compressor rotor 21 and the turbine rotor 41 are located on the same axis Ar, and are connected to each other to form a gas turbine rotor 11. For example, a rotor of a generator GEN is connected to the gas turbine rotor 11. The gas turbine 10 further includes an intermediate casing 16. The intermediate casing 16 is disposed between the compressor casing 25 and the turbine casing 45 in the axial direction Da. The compressor casing 25, the intermediate casing 16, and the turbine casing 45 are connected to each other to form a gas turbine casing 15.

The compressor rotor 21 includes a rotor shaft 22 extending in the axial direction Da around the axis Ar, and a plurality of rotor blade rows 23 attached to the rotor shaft 22. The plurality of rotor blade rows 23 are arranged in the axial direction Da. Each of the rotor blade rows 23 is formed of a plurality of rotor blades 23a arranged in the circumferential direction Dc. One stator vane row 26 of the plurality of stator vane rows 26 is disposed on the axial downstream side Dad of each of the plurality of rotor blade rows 23. Each of the stator vane rows 26 is provided inside the compressor casing 25. Each of the stator vane rows 26 is formed of a plurality of stator vanes 26a arranged in the circumferential direction Dc.

Figure 2:
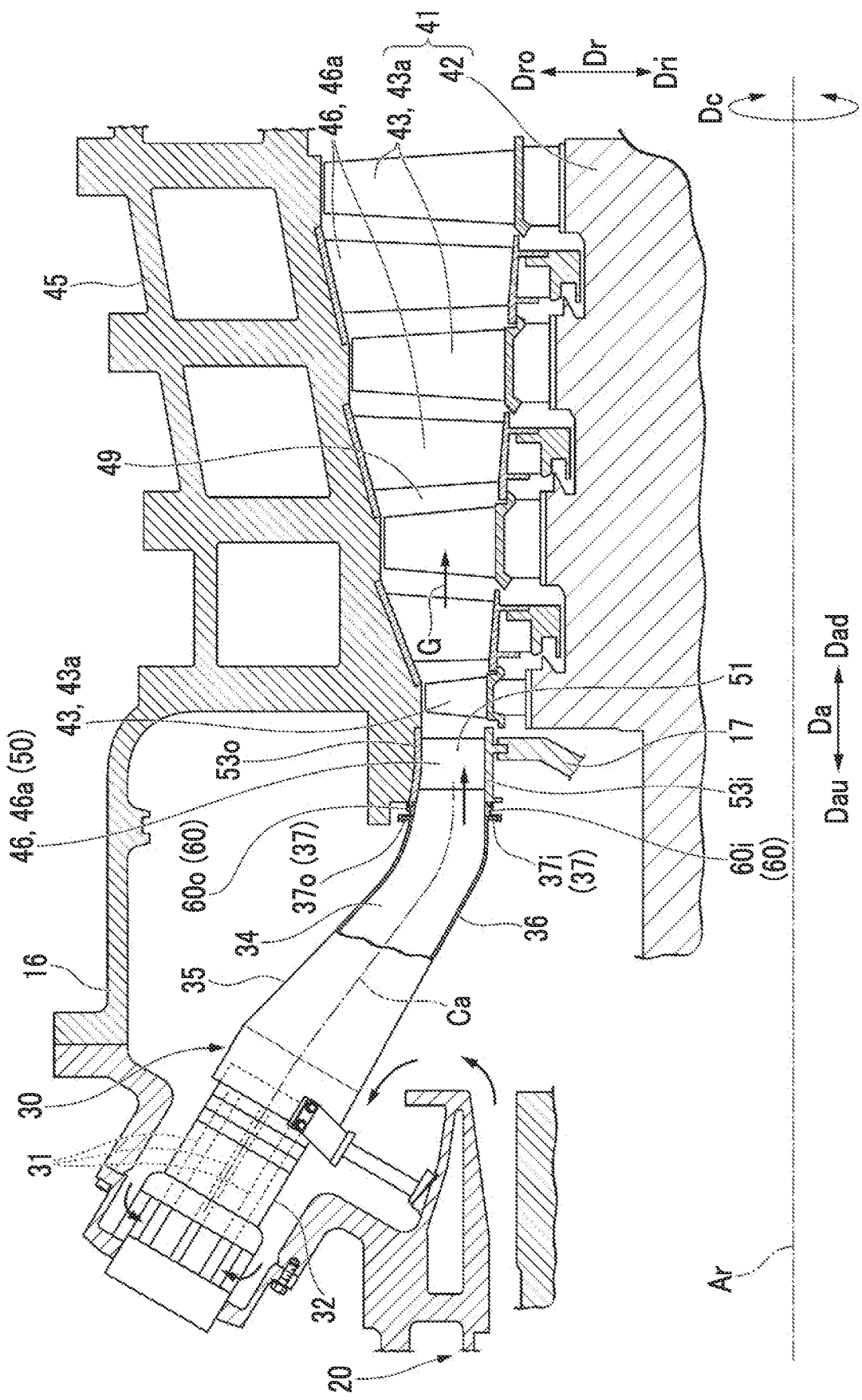
FIG. 2 is a cross-sectional view of a main part of the gas turbine according to one embodiment of the present disclosure.

As illustrated in FIGS. 1 and 2, the turbine rotor 41 includes a rotor shaft 42 extending in the axial direction Da around the axis Ar, and a plurality of rotor blade rows 43 attached to the rotor shaft 42. The plurality of rotor blade rows 43 are arranged in the axial direction Da. Each of the rotor blade rows 43 is formed of a plurality of rotor blades 43a arranged in the circumferential direction Dc. One stator vane row 46 of the plurality of stator vane rows 46 is disposed on the axial upstream side Dau of each of the plurality of rotor blade rows 43. Each of the stator vane rows 46 is provided inside the turbine casing 45. Each of the stator vane rows 46 is formed of a plurality of stator vanes 46a arranged in the circumferential direction Dc.

An annular space which is formed between an outer peripheral side of the rotor shaft 42 and an inner peripheral side of the turbine casing 45 and in which the stator vanes 46a and the rotor blades 43a are disposed in the axial direction Da forms a combustion gas flow path 49 through which the combustion gas G from the combustors 30 flows. The combustion gas flow path 49 forms an annular shape around the axis Ar and is long in the axial direction Da.

The plurality of combustors 30 are arranged around the axis Ar in the circumferential direction Dc, and are attached to the intermediate casing 16. As illustrated in FIG. 2, the combustor 30 includes a combustion tube 35 in which fuel is combusted; a plurality of burners 31 that spray the fuel into the combustion tube 35; and a burner frame 32 that supports the plurality of burners 31. The combustion tube 35 includes a cylinder 36 having a tubular shape around a combustor axis Ca, and an outlet flange 37 protruding from one end of the cylinder 36 to an outer peripheral side. The burner frame 32 is mounted to the other end of the cylinder 36. An inner peripheral side of the cylinder 36 forms a combustion space 34. The cylinder 36 extends in a direction including a directional component of the axial downstream side Dad in a state where the combustor 30 is attached to the intermediate casing 16. The outlet flange 37 is provided at an end on the axial downstream side Dad of the cylinder 36.

First stage stator vanes 46a forming a first stage stator vane row 46 located on the most axial upstream side Dau among the plurality of stator vane rows 46, and the outlet flange 37 of the combustion tube 35 are connected by an outlet seal 60. Hereinafter, the first stage stator vanes 46a are simply referred to as a stator vane 50.

A shape of the other end of the cylinder 36 to which the burner frame 32 is mounted is a substantially circular shape around the combustor axis Ca (refer to FIG. 2) when viewed in the axial direction Da. On the other hand, as illustrated in FIG. 3, a shape of one end of the cylinder 36 at which the outlet flange 37 is formed is a substantially isosceles trapezoidal shape when viewed in the axial direction Da. A gas path surface 38 that is an inner peripheral surface of the cylinder 36 defines an outer edge of the combustion space 34.

The gas path surface 38 has an outer gas path surface 38o, an inner gas path surface 38i, and a pair of peripheral gas path surfaces 38s. The outer gas path surface 38o corresponds to a lower base of the isosceles trapezoidal shape. The inner gas path surface 38i corresponds to an upper base of the isosceles trapezoidal shape. However, the outer gas path surface 38o and the inner gas path surface 38i are not flat surfaces but circular arc surfaces around the axis Ar.

Figure 3:
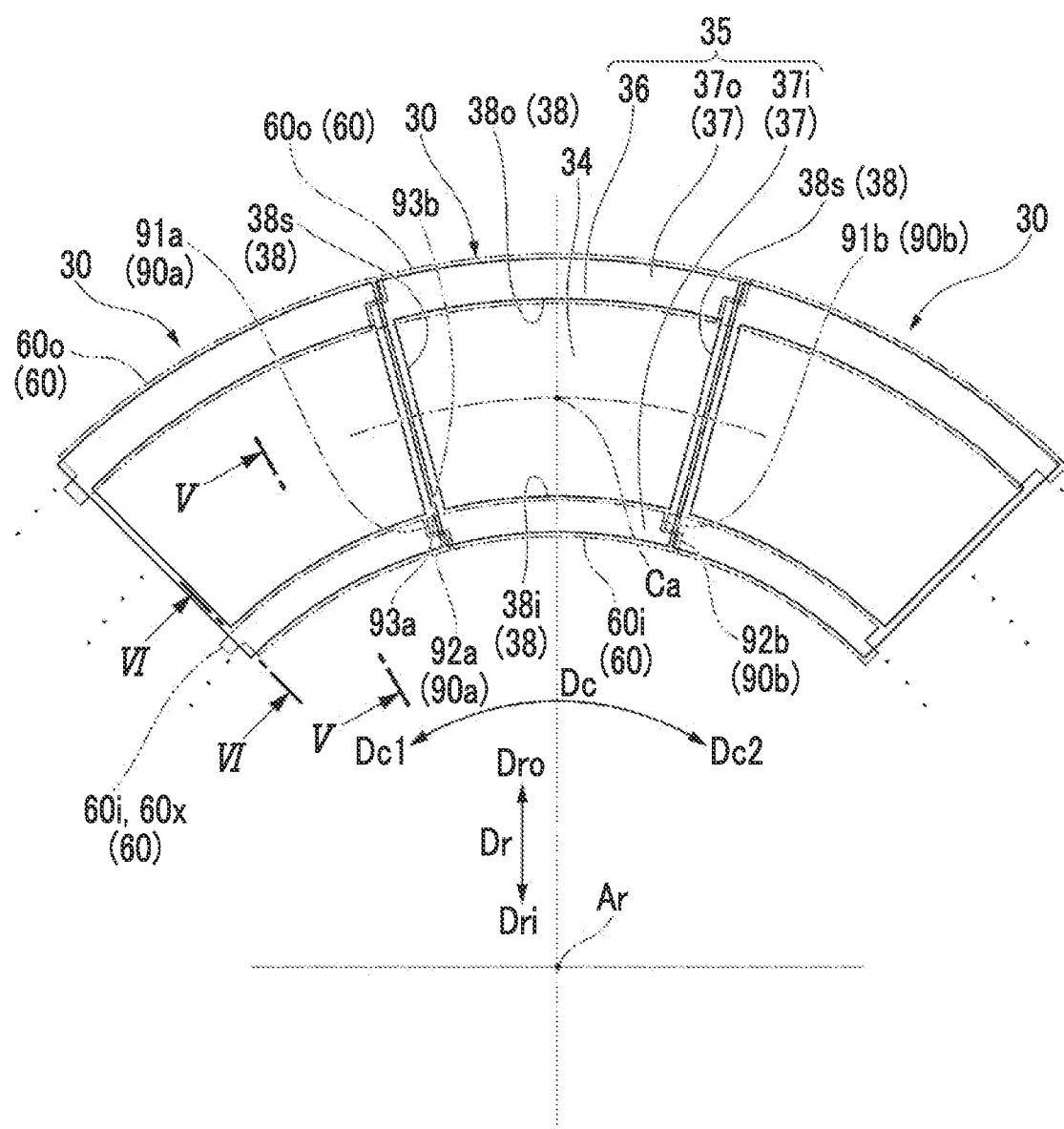
FIG. 3 is a view of a plurality of combustors according to one embodiment of the present disclosure when viewed from an axial downstream side.

As illustrated in FIG. 3, the outlet flange 37 of the combustion tube 35 includes an outer flange 37o and an inner flange 37i. The outer flange 37o protrudes to an outer peripheral side of the cylinder 36 from a portion which is one end of the cylinder 36 and in which the outer gas path surface 38o is formed in the circumferential direction with respect to the combustor axis Ca. The inner flange 37i protrudes to the outer peripheral side of the cylinder 36 from a portion which is one end of the cylinder 36 and in which the inner gas path surface 38i is formed in the circumferential direction with respect to the combustor axis Ca.

As illustrated in FIG. 2, the stator vane 50 includes a vane body 51; an inner shroud 53i provided on one side of the vane body 51 in a vane height direction; and an outer shroud 53o provided on the other side of the vane body 51 in the vane height direction. Both the inner shroud 53i and the outer shroud 53o extend in a direction perpendicular to the vane height direction. The vane height direction is the radial direction Dr in a state where the stator vane 50 is attached to the turbine casing 45. In addition, one side in the vane height direction is the radial outer side Dro, and the other side in the vane height direction is the radial inner side Dri. Therefore, the inner shroud 53i is provided on the radial inner side Dri of the vane body 51, and the outer shroud 53o is provided on the radial outer side Dro of the vane body 51. In addition, the vane body 51 is disposed in the combustion gas flow path 49 through which the combustion gas G passes.

An outer outlet seal 60o connects the outer flange 37o of the combustion tube 35 and the outer shroud 53o of the stator vane 50. An inner outlet seal 60i connects the inner flange 37i of the combustion tube 35 and the inner shroud 53i of the stator vane 50.

Portions on the axial upstream side Dau of the combustor 30, the outlet seal 60, and the first stage stator vane 50 are all located inside the intermediate casing 16.

As illustrated in FIG. 1, the compressor 20 compresses the air A to generate compressed air, and discharges the compressed air into the intermediate casing 16. The compressed air inside the intermediate casing 16 flows into the combustor 30. The fuel F is supplied to the combustor 30. In the combustor 30, the fuel F is combusted in the compressed air to generate the high-temperature and high-pressure combustion gas G. The combustion gas G is delivered from the combustor 30 to the combustion gas flow path 49 inside the turbine 40. The combustion gas G rotates the turbine rotor 41 in the process of flowing through the combustion gas flow path 49 to the axial downstream side Dad. The rotor of the generator GEN connected to the gas turbine rotor 11 is rotated by rotation of the turbine rotor 41. As a result, the generator GEN generates electricity.

The outer outlet seal 60o has a shape symmetric with that of the inner outlet seal 60i with respect to the combustor axis Ca in the radial direction Dr, but the shape of the outer outlet seal 60o is basically the same as the shape of the inner outlet seal 60i. Therefore, hereinafter, the inner outlet seal 60i is simply referred to as the outlet seal 60, and an embodiment of the outlet seal 60 will be described.

[Embodiment of Outlet Seal]

Figure 7:
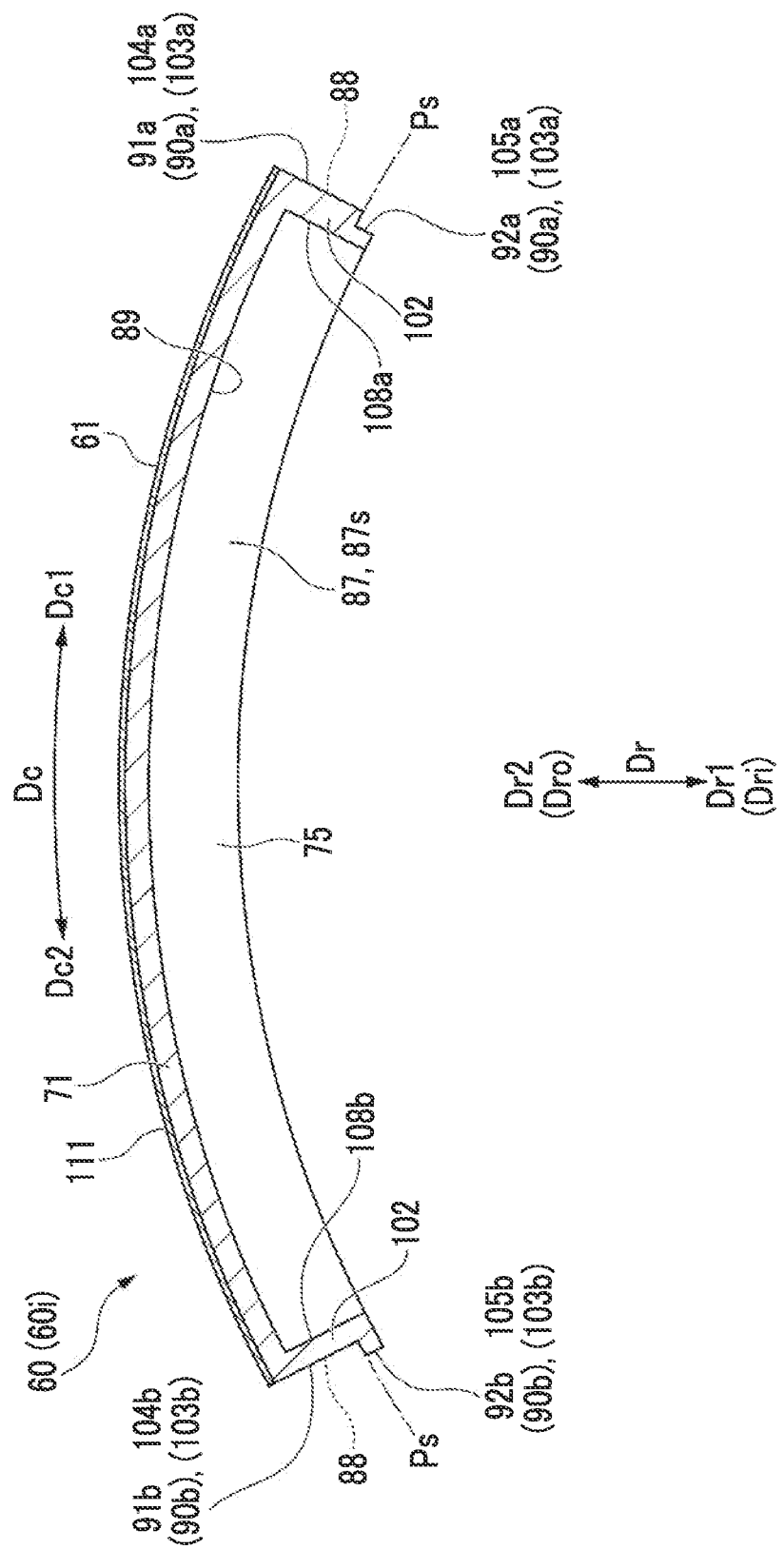
FIG. 7 is a cross-sectional view taken along line VII-VII in FIG. 6.
Figure 8:
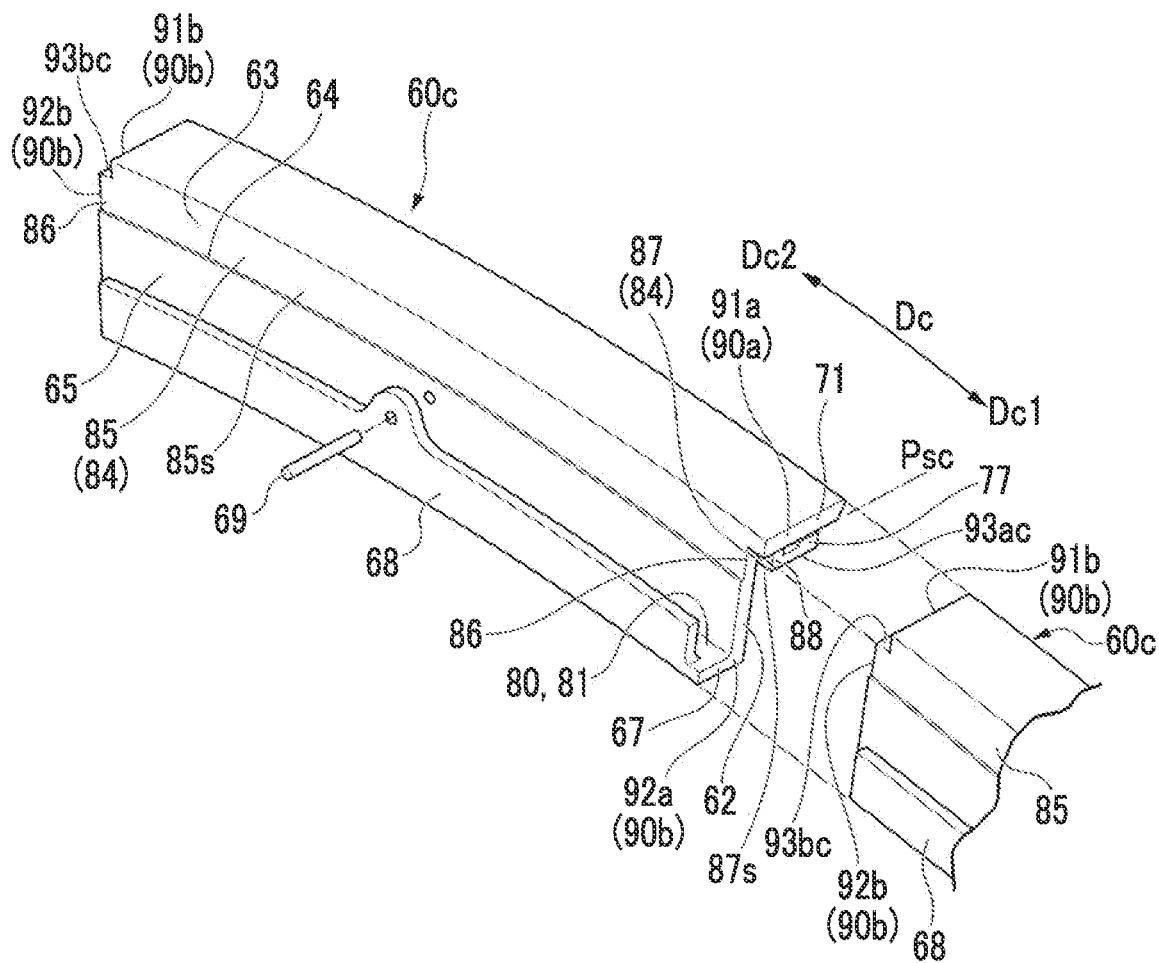
FIG. 8 is a perspective view of an outlet seal in a comparative example.

Hereinafter, the outlet seal of the present embodiment will be described with reference to FIGS. 3 to 10. FIGS. 3 to 7 are views illustrating the outlet seal of the present embodiment. FIGS. 8 to 10 are views illustrating an outlet seal of a comparative example. In addition, FIG. 5 is a cross-sectional view taken along line V-V in FIG. 3. FIG. 6 is a cross-sectional view taken along line VI-VI in FIG. 3. FIG. 7 is a cross-sectional view taken along line VII-VII in FIG. 6.

Figure 4:
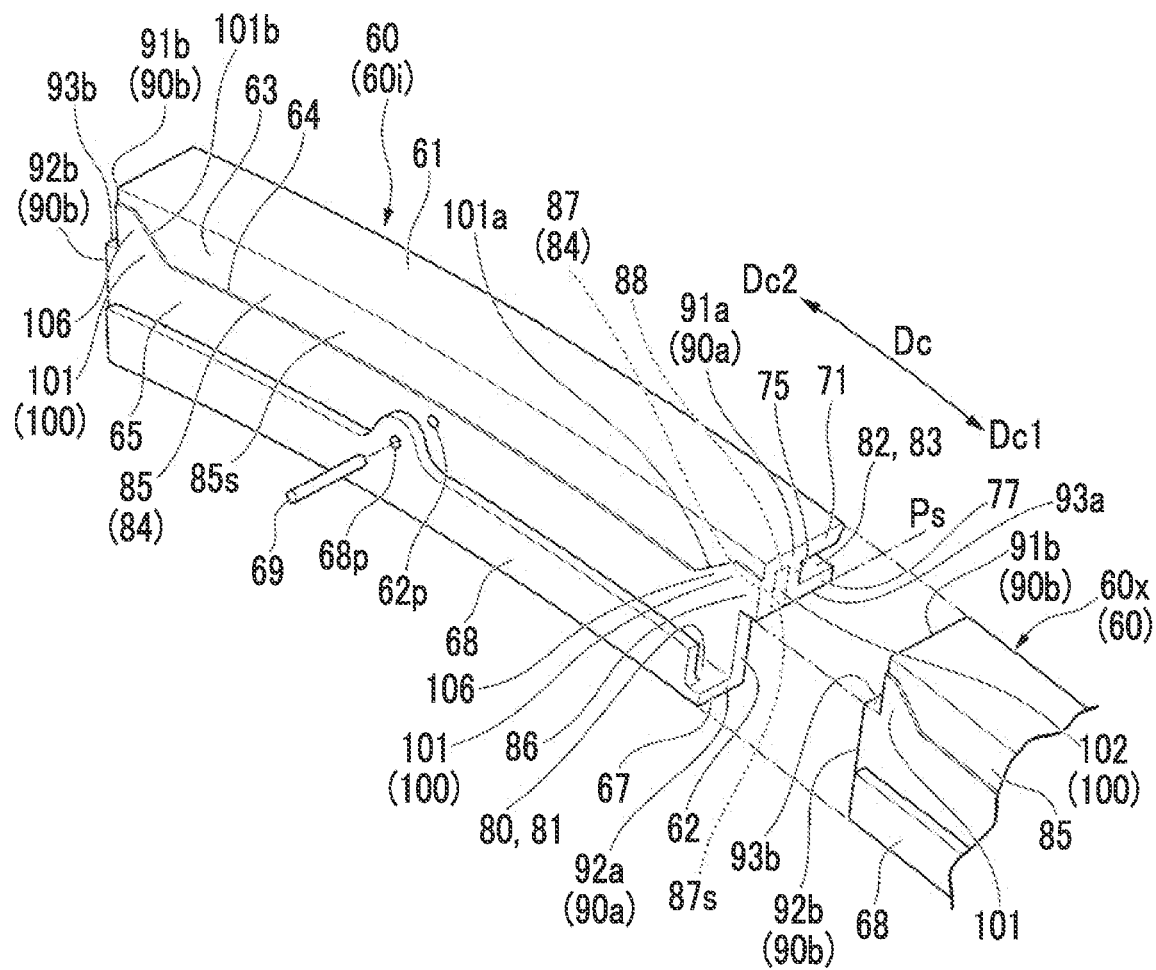
FIG. 4 is a perspective view of an outlet seal according to one embodiment of the present disclosure.

As illustrated in FIGS. 4 and 5, the outlet seal 60 of the present embodiment includes a seal body 61 extending in the circumferential direction Dc and a lid member 100 provided on the seal body 61.

As illustrated in FIGS. 4 and 5, the seal body 61 includes a flange first groove side plate 62, a flange groove bottom plate 67, a flange second groove side plate 68, a shroud first groove side plate 71, a shroud groove bottom plate 75, and a shroud second groove side plate 77.

The flange first groove side plate 62 extends in the circumferential direction Dc and in the radial direction Dr. The flange groove bottom plate 67 extends in the circumferential direction Dc and extends from an end on a radial first side Dr1 of the flange first groove side plate 62 toward an axial first side Da1 that is one side in the axial direction Da, the radial first side Dr1 being one side in the radial direction Dr. The flange second groove side plate 68 extends from an end on the axial first side Da1 of the flange groove bottom plate 67 toward a radial second side Dr2 that is the other side in the radial direction Dr.

The shroud first groove side plate 71 extends in the circumferential direction Dc and extends from an end on the radial second side Dr2 of the flange first groove side plate 62 toward an axial second side Da2 that is the other side in the axial direction Da. A surface of the shroud first groove side plate 71 facing the radial second side Dr2 forms a gas path surface 72 in contact with the combustion gas G. The gas path surface 72 is a surface that defines a combustion gas flow path 99 through which the combustion gas G that has flowed out from the combustion tube 35 flows. The combustion gas flow path 99 defined by the outlet seal 60 is continuous with the combustion space 34 in the combustion tube 35 and is also continuous with the combustion gas flow path 49 inside the turbine 40. A surface of the shroud first groove side plate 71 facing the radial first side Dr1 forms a counter-gas path surface 73. The shroud groove bottom plate 75 extends in the circumferential direction Dc and extends from an intermediate portion of the shroud first groove side plate 71 in the axial direction Da toward the radial first side Dr1. The shroud second groove side plate 77 extends in the circumferential direction Dc and extends from an end on the radial first side Dr1 of the shroud groove bottom plate 75 toward the axial second side Da2.

A pin hole 68p penetrating through the flange second groove side plate 68 in the axial direction Da is formed in a central portion of the flange second groove side plate 68 in the circumferential direction Dc. In addition, a pin hole 62p penetrating through the flange first groove side plate 62 in the axial direction Da is also formed in the flange first groove side plate 62. The pin hole 62p of the flange first groove side plate 62 is formed at the same position in the circumferential direction Dc and in the radial direction Dr as that of the pin hole 68p formed in the flange second groove side plate 68. In addition, a pin hole 37p penetrating through the outlet flange 37 in the axial direction Da is also formed in a central portion of the outlet flange 37 in the circumferential direction Dc. One pin 69 is inserted into the pin hole 68p of the flange second groove side plate 68, into the pin hole 37p of the outlet flange 37, and into the pin hole 62p of the flange first groove side plate 62. The pin 69 regulates relative positions of the outlet seal 60 in the circumferential direction Dc and in the radial direction Dr with respect to the outlet flange 37.

Both the axial first side Da1 with respect to the outer outlet seal 60o and the axial first side Da1 with respect to the inner outlet seal 60i are the axial upstream side Dau. In addition, both the axial second side Da2 with respect to the outer outlet seal 60o and the axial second side Da2 with respect to the inner outlet seal 60i are the axial downstream side Dad. As described above, the outer outlet seal 60o has a shape symmetric with that of the inner outlet seal 60i with respect to the combustor axis Ca in the radial direction Dr. For this reason, the radial first side Dr1 with respect to the outer outlet seal 60o is the radial outer side Dro, whereas the radial first side Dr1 with respect to the inner outlet seal 60i is the radial inner side Dri. In addition, the radial second side Dr2 with respect to the outer outlet seal 60o is the radial inner side Dri, whereas the radial second side Dr2 with respect to the inner outlet seal 60i is the radial outer side Dro. Therefore, in the inner outlet seal 60i as the outlet seal 60 illustrated in FIGS. 4 to 6, for example, the flange groove bottom plate 67 extends from the end on the radial inner side Dri (radial first side Dr1) of the flange first groove side plate 62 toward the axial upstream side Dau (axial first side Da1).

In the present embodiment, the flange first groove side plate 62, the flange groove bottom plate 67, and the flange second groove side plate 68 form a flange fitting groove 81 that is recessed to the radial first side Dr1 and that extends in the circumferential direction Dc. The outlet flange 37 of the combustor 30 enters the flange fitting groove 81, and the outlet flange 37 is connected to the flange fitting groove 81. Therefore, a combustor connecting portion 80 includes the flange first groove side plate 62, the flange groove bottom plate 67, and the flange second groove side plate 68. For this reason, the combustor connecting portion 80 is formed at a portion on the axial first side Da1 of the seal body 61.

In addition, in the present embodiment, the shroud first groove side plate 71, the shroud groove bottom plate 75, and the shroud second side plate form a shroud fitting groove 83 that is recessed to the axial first side Da1 and that extends in the circumferential direction Dc. An end portion on the axial first side Da1 (axial upstream side Dau) of the inner shroud 53 in of the stator vane 50 enters the shroud fitting groove 83, and the inner shroud 53i of the stator vane 50 is connected to the shroud fitting groove 83. Therefore, a stator vane connecting portion 82 includes the shroud first groove side plate 71, the shroud groove bottom plate 75, and the shroud second side plate. For this reason, the stator vane connecting portion 82 is formed at a portion on the axial second side Da2 of the seal body 61.

The seal body 61 includes a plurality of recessed portions 84 extending in the circumferential direction Dc.

The flange first groove side plate 62 of the seal body 61 has a first upstream side surface 63, a first recessed portion side surface 64, and a second upstream side surface 65. The first upstream side surface 63 faces the axial first side Da1 and extends from the end on the radial second side Dr2 of the flange first groove side plate 62 toward the radial first side Dr1. The first recessed portion side surface 64 faces the radial second side Dr2 and extends from an end on the radial first side Dr1 of the first upstream side surface 63 toward the axial first side Da1.

The second upstream side surface 65 faces the axial first side Da1 and extends from an end on the axial first side Da1 of the first recessed portion side surface 64 toward the radial first side Dr1. Both the first upstream side surface 63 and the second upstream side surface 65 face a downstream side end surface 39 that is a surface facing the axial downstream side Dad of the outlet flange 37 in the axial direction Da. In addition, the first upstream side surface 63 and the first recessed portion side surface 64 of the flange first groove side plate 62 define a first recessed portion 85 that is recessed toward the axial second side Da2 with respect to the second upstream side surface 65 and that extends in the circumferential direction Dc. The first recessed portion 85 is one of the plurality of recessed portions 84 provided in the seal body 61. The first upstream side surface 63 forms a bottom surface of the first recessed portion 85. An end of the first recessed portion 85 in the circumferential direction Dc is open and forms an end opening 86. The end opening 86 is closed by a part of the lid member 100.

The flange first groove side plate 62, the shroud first groove side plate 71, and the shroud groove bottom plate 75 define a second recessed portion 87 that is recessed toward the radial second side Dr2 and that extends in the circumferential direction Dc. The second recessed portion 87 is one of the plurality of recessed portions 84 provided in the seal body 61.

On the counter-gas path surface 73 of the shroud first groove side plate 71, a portion between the flange first groove side plate 62 and the shroud groove bottom plate 75 in the axial direction Da forms a bottom surface 89 of the second recessed portion 87. An end of the second recessed portion 87 in the circumferential direction Dc is also open and forms an end opening 88. The end opening 88 is closed by a part of the lid member 100.

A bottom surface of the recessed portion 84 may face a second side in an X direction opposite to a first side in the X direction to which the recessed portion is recessed, and does not have to be a surface perpendicular to the X direction. Therefore, for example, even when a surface is inclined with respect to the X direction, the surface forms the bottom surface of the recessed portion 84 as long as the surface faces the second side in the X direction. In addition, among a plurality of surfaces continuous with each other, even when some surfaces are inclined with respect to the X direction and other surfaces are perpendicular to the X direction, the plurality of surfaces continuous with each other form the bottom surface of the recessed portion 84 as a whole as long as any one of the plurality of surfaces continuous with each other faces the second side in the X direction.

As illustrated in FIGS. 4, 6, and 7, the seal body 61 has a first side surface 90a facing a circumferential first side Dc1 that is one side of both sides in the circumferential direction Dc, and a second side surface 90b facing a circumferential second side Dc2 that is the other side of both the sides in the circumferential direction Dc.

The first side surface 90a of the seal body 61 has a first flow path side surface 91a and a first counter-flow path side surface 92a. The first flow path side surface 91a is formed on the radial second side Dr2 from a step position Ps on the seal body 61 in the radial direction Dr. In addition, the first counter-flow path side surface 92a is formed on the radial first side Dr1 from the step position Ps. The first flow path side surface 91a is located on the circumferential first side Dc1 with respect to the first counter-flow path side surface 92a. Therefore, the first flow path side surface 91a is stepped with respect to the first counter-flow path side surface 92a. The step position Ps is a position located in the radial direction Dr on the radial first side Dr1 with respect to the shroud fitting groove 83 and on the radial second side Dr2 with respect to a surface of the shroud second groove side plate 77 facing the radial first side Dr1.

The first flow path side surface 91a includes a portion of a surface of the flange first groove side plate 62 facing the circumferential first side Dc1, the portion being located on the radial second side Dr2 with respect to the step position Ps; an entirety of a surface of the shroud first groove side plate 71 facing the circumferential first side Dc1; a portion of a surface of the shroud groove bottom plate 75 facing the circumferential first side Dc1, the portion being located on the radial second side Dr2 with respect to the step position Ps; and a portion of a surface of the shroud second groove side plate 77 facing the circumferential first side Dc1, the portion being located on the radial second side Dr2 with respect to the step position Ps. In addition, the first counter-flow path side surface 92a includes a portion of the surface of the flange first groove side plate 62 facing the circumferential first side Dc1, the portion being located on the radial first side Dr1 with respect to the step position Ps; an entirety of a surface of the flange groove bottom plate 67 facing the circumferential first side Dc1; an entirety of a surface of the flange second groove side plate 68 facing the circumferential first side Dc1; a portion of the surface of the shroud groove bottom plate 75 facing the circumferential first side Dc1, the portion being located on the radial first side Dr1 with respect to the step position Ps; and a portion of the surface of the shroud second groove side plate 77 facing the circumferential first side Dc1, the portion being located on the radial first side Dr1 with respect to the step position Ps.

The first flow path side surface 91a and the first counter-flow path side surface 92a are connected by a first stepped surface 93a. The first stepped surface 93a is located at the step position Ps and faces the radial first side Dr1.

The second side surface 90b of the seal body 61 has a second flow path side surface 91b and a second counter-flow path side surface 92b. The second flow path side surface 91b is formed on the radial second side Dr2 from the step position Ps described above. In addition, the second counter-flow path side surface 92b is formed on the radial first side Dr1 from the step position Ps. The second flow path side surface 91b is located on the circumferential first side Dc1 with respect to the second counter-flow path side surface 92b. Therefore, the second flow path side surface 91b is stepped with respect to the second counter-flow path side surface 92b. A step amount is the same as a step amount between the first flow path side surface 91a and the first counter-flow path side surface 92a.

The second flow path side surface 91b includes a portion of a surface of the flange first groove side plate 62 facing the circumferential second side Dc2, the portion being located on the radial second side Dr2 with respect to the step position Ps; an entirety of a surface of the shroud first groove side plate 71 facing the circumferential second side Dc2; a portion of a surface of the shroud groove bottom plate 75 facing the circumferential second side Dc2, the portion being located on the radial second side Dr2 with respect to the step position Ps; and a portion of a surface of the shroud second groove side plate 77 facing the circumferential second side Dc2, the portion being located on the radial second side Dr2 with respect to the step position Ps. In addition, the second counter-flow path side surface 92b includes a portion of the surface of the flange first groove side plate 62 facing the circumferential second side Dc2, the portion being located on the radial first side Dr1 with respect to the step position Ps; an entirety of a surface of the flange groove bottom plate 67 facing the circumferential second side Dc2; an entirety of a surface of the flange second groove side plate 68 facing the circumferential second side Dc2; a portion of the surface of the shroud groove bottom plate 75 facing the circumferential second side Dc2, the portion being located on the radial first side Dr1 with respect to the step position Ps; and a portion of the surface of the shroud second groove side plate 77 facing the circumferential second side Dc2, the portion being located on the radial first side Dr1 with respect to the step position Ps.

The second flow path side surface 91b and the second counter-flow path side surface 92b are connected by a second stepped surface 93b. The second stepped surface 93b is located at the step position Ps and faces the radial second side Dr2.

The first flow path side surface 91a of the outlet seal 60 and the second flow path side surface 91b of another outlet seal 60x adjacent to the circumferential first side Dc1 of the outlet seal 60 face each other in the circumferential direction Dc. The first counter-flow path side surface 92a of the outlet seal 60 and the second counter-flow path side surface 92b of the another outlet seal 60x face each other in the circumferential direction Dc. As illustrated in FIGS. 3 and 4, the first stepped surface 93a of the outlet seal 60 and the second stepped surface 93b of the another outlet seal 60x face each other in the radial direction Dr.

As illustrated in FIGS. 4 and 6, the lid members 100 are provided at ends of the plurality of recessed portions 84 in the circumferential direction Dc. The lid members 100 include first lid members 101 provided at both ends of the first recessed portion 85 in the circumferential direction Dc, and second lid members 102 provided at both ends of the second recessed portion 87 in the circumferential direction Dc. Both the first lid member 101 and the second lid member 102 extend in the axial direction Da and in the radial direction Dr.

The first lid members 101 are disposed at the positions of both the ends of the first recessed portion 85 in the circumferential direction Dc to overlap a recessed space 85s in the axial direction Da and in the radial direction Dr, the recessed space 85s being formed by the first recessed portion 85. Specifically, the first lid member 101 extends toward the axial first side Da1 from the first upstream side surface 63 that is the bottom surface of the first recessed portion 85 to the position of the second upstream side surface 65 in the axial direction Da, at the position of the end of the first recessed portion 85 in the circumferential direction Dc. Namely, the first lid member 101 protrudes from the first upstream side surface 63 that is the bottom surface of the first recessed portion 85, and closes the end opening 86 of the first recessed portion 85, at the position of the end of the first recessed portion 85 in the circumferential direction Dc. Similarly to the first upstream side surface 63 and the second upstream side surface 65 of the seal body 61, a lid upstream side surface 106 that is a surface of the first lid member 101 facing the axial first side Da1 faces the downstream side end surface 39 of the outlet flange 37 in the axial direction Da. In addition, the lid upstream side surface 106 is flush with the second upstream side surface 65. Of two first lid members 101, in the first lid member 101 disposed at the end on the circumferential first side Dc1 of the first recessed portion 85, a surface 101a facing the circumferential second side Dc2 (refer to FIG. 4) is a surface defining a part of the recessed space in which the end on the circumferential first side Dc1 of the first recessed portion 85 can be closed by the first lid member 101. In addition, of the two first lid members 101, in the first lid member 101 disposed at the end on the circumferential second side Dc2 of the first recessed portion 85, a surface 101b facing the circumferential first side Dc1 (refer to FIG. 4) is a surface defining a part of the recessed space in which the end on the circumferential second side Dc2 of the first recessed portion 85 can be closed by the first lid member 101.

As illustrated in FIGS. 4, 6, and 7, the second lid members 102 are disposed at the positions of both the ends of the second recessed portion 87 in the circumferential direction Dc to overlap a recessed space 87s in the axial direction Da and in the radial direction Dr, the recessed space 87s being formed by the second recessed portion 87. Specifically, the second lid member 102 extends toward the radial first side Dr1 from the bottom surface 89 of the second recessed portion 87 to a position on the radial first side Dr1 with respect to the position of the shroud fitting groove 83 in the radial direction Dr, at the position of the end of the second recessed portion 87 in the circumferential direction Dc. Namely, the second lid member 102 protrudes from the bottom surface 89 of the second recessed portion 87 and closes the end opening 88 of the second recessed portion 87 at the position of the end of the second recessed portion 87 in the circumferential direction Dc.

Of two second lid members 102, the second lid member 102 provided at the end on the circumferential first side Dc1 of the second recessed portion 87 has a first lid side surface 103a facing the circumferential first side Dc1 and being continuous with the first side surface 90a of the seal body 61, and a first lid inner surface 108a facing the circumferential second side Dc2 and being continuous with the bottom surface 89 (refer to FIG. 7). The first lid side surface 103a has a first lid flow path side surface 104a and a first lid counter-flow path side surface 105a. The first lid flow path side surface 104a is formed on the radial second side Dr2 from the step position Ps described above, and is continuous with the first flow path side surface 91a of the seal body 61. The first lid counter-flow path side surface 105a is formed on the radial first side Dr1 from the step position Ps, and is continuous with the first counter-flow path side surface 92a. For this reason, the first lid flow path side surface 104a is stepped with respect to the first lid counter-flow path side surface 105a. A step amount is the same as a step amount between the first flow path side surface 91a and the first counter-flow path side surface 92a of the seal body 61. When the first lid side surface 103a is assumed to be a surface of the second lid member 102, the first lid inner surface 108a is a back surface of the second lid member 102. The first lid inner surface 108a is a surface defining a part of the recessed space in which the end of the second recessed portion 87 in the circumferential direction Dc can be closed by the second lid member 102.

Of the two second lid members 102, the second lid member 102 provided at the end on the circumferential second side Dc2 of the second recessed portion 87 has a second lid side surface 103b facing the circumferential second side Dc2 and being continuous with the second side surface 90b of the seal body 61, and a second lid inner surface 108b facing the circumferential first side Dc1 and being continuous with the bottom surface 89 (refer to FIG. 7). The second lid side surface 103b has a second lid flow path side surface 104b and a second lid counter-flow path side surface 105b. The second lid flow path side surface 104b is formed on the radial second side Dr2 from the step position Ps described above, and is continuous with the second flow path side surface 91b of the seal body 61. The second lid counter-flow path side surface 105b is formed on the radial first side Dr1 from the step position Ps, and is continuous with the second counter-flow path side surface 92b. For this reason, the second lid flow path side surface 104b is stepped with respect to the second lid counter-flow path side surface 105b. A step amount is the same as a step amount between the second flow path side surface 91b and the second counter-flow path side surface 92b of the seal body 61. When the second lid side surface 103b is assumed to be a surface of the second lid member 102, the second lid inner surface 108b is a back surface of the second lid member 102. The second lid inner surface 108b is a surface defining a part of the recessed space in which the end of the second recessed portion 87 in the circumferential direction Dc can be closed by the second lid member 102.

As illustrated in FIGS. 5 and 6, the outlet seal 60 described above is formed of a base material 110, a thermal barrier coating 111, and an abrasion resistant coating 112. The base material 110 is made of, for example, a nickel-based alloy, a cobalt-based alloy, or the like. The thermal barrier coating 111 is made of, for example, a ceramic containing chromium, nickel, or the like. The abrasion resistant coating 112 is formed of, for example, an alloy containing chromium carbide or the like. The thermal barrier coating 111 plays a role of suppressing thermal conduction to the base material 110, and has a thermal barrier property higher than that of the base material 110 or of the abrasion resistant coating 112. In addition, the abrasion resistant coating 112 plays a role of suppressing abrasion of the surface, and has an abrasion resistance higher than that of the base material 110 or of the thermal barrier coating 111. In the outlet seal 60, a part of the surface of the outlet seal 60 is formed of the thermal barrier coating 111 or the abrasion resistant coating 112, and the other portion is formed of the base material 110.

As illustrated in FIG. 5, the gas path surface 72, the first upstream side surface 63, and the first recessed portion side surface 64 of the seal body 61 are formed of the thermal barrier coating 111. An inner peripheral surface of the cylinder 36 of the combustion tube 35, a part of the downstream side end surface 39 of the inner flange 37i of the combustion tube 35, and a part of the downstream side end surface 39 of the outer flange 37o of the combustion tube 35 are also formed of the thermal barrier coating 111. In addition, a gas path surface of the inner shroud 53i of the stator vane 50 facing the radial outer side Dro, and a gas path surface of the outer shroud 53o of the stator vane 50 facing the radial inner side Dri are also formed of the thermal barrier coating 111.

As illustrated in FIG. 6, the lid upstream side surface 106 that is a surface of the first lid member 101 facing the axial first side Da1 is formed of the abrasion resistant coating 112. In addition, both end portions of the second upstream side surface 65 of the seal body 61 in the circumferential direction Dc are also formed of the abrasion resistant coating 112. The abrasion resistant coating 112 of the seal body 61 is continuous with the abrasion resistant coating 112 of the first lid member 101. Both end portions of the downstream side end surface 39 of the inner flange 37i in the circumferential direction Dc and both end portions of the downstream side end surface 39 of the outer flange 37o in the circumferential direction Dc are also formed of the abrasion resistant coating 112. The portions of the inner flange 37i and the outer flange 37o, which are formed of the abrasion resistant coating 112, face the portions of the outlet seal 60, which are formed of the abrasion resistant coating 112, in the axial direction Da.

Before actions and effects of the outlet seal 60 of the present embodiment are described, an outlet seal 60c of a comparative example will be described with reference to FIGS. 8 to 10. FIG. 9 is a cross-sectional view corresponding to the cross-sectional view taken along line V-V in FIG. 3. In addition, FIG. 10 is a cross-sectional view corresponding to the cross-sectional view taken along line VI-VI in FIG. 3.

The outlet seal 60c of the comparative example does not include the lid member 100 in the present embodiment. Namely, the outlet seal 60c of the comparative example includes only a portion corresponding to the seal body 61 in the present embodiment. In addition, a step position Psc on the outlet seal 60c of the comparative example is a position between the shroud fitting groove 83 and the gas path surface 72 in the radial direction Dr.

The outlet seal 60c of the comparative example has basically the same configuration as that of the outlet seal 60 of the present embodiment except that the lid member 100 in the present embodiment is not provided and except that the step position Psc is different from the step position Ps in the present embodiment. For this reason, similarly to the outlet seal 60 of the present embodiment, the outlet seal 60c of the comparative example includes the flange fitting groove 81, the shroud fitting groove 83, the first recessed portion 85, and the second recessed portion 87.

In addition, similarly to the outlet seal 60 of the present embodiment, the outlet seal 60c of the comparative example has the first side surface 90a facing the circumferential first side Dc1 and the second side surface 90b facing the circumferential second side Dc2. Similarly to the first side surface 90a of the present embodiment, the first side surface 90a of the comparative example has the first flow path side surface 91a and the first counter-flow path side surface 92a. The first flow path side surface 91a and the first counter-flow path side surface 92a are connected by a first stepped surface 93ac. Similarly to the second side surface 90b of the present embodiment, the second side surface 90b of the comparative example has the second flow path side surface 91b and the second counter-flow path side surface 92b. The second flow path side surface 91b and the second counter-flow path side surface 92b are connected by a second stepped surface 93bc. However, as described above, since the step position Psc of the comparative example is different from the step position Ps of the present embodiment, the positions of the first stepped surface 93ac and the second stepped surface 93bc in the radial direction Dr in the comparative example are different from the positions of the first stepped surface 93a and the second stepped surface 93b in the radial direction Dr in the present embodiment.

Both ends of the first recessed portion 85 in the circumferential direction Dc in the comparative example are open and form the end openings 86 and 88. In addition, both ends of the second recessed portion 87 in the circumferential direction Dc in the comparative example are also open and form the end openings 86 and 88. However, since the outlet seal 60c of the comparative example does not include the first lid member 101 and the second lid member 102 in the present embodiment, the compressed air inside the intermediate casing 16 flows into the first recessed portion 85 from the end opening 86 of the first recessed portion 85 through a side surface of the outlet flange 37 and through a side surface of the flange first groove side plate 62. In addition, the compressed air inside the intermediate casing 16 and inside the second recessed portion 87 flows into the shroud fitting groove 83 from the end opening 88 of the second recessed portion 87 through a side surface of the shroud groove bottom plate 75. The compressed air that has flowed into the first recessed portion 85 flows into the combustion gas flow path 99. In addition, the compressed air that has flowed into the shroud fitting groove 83 also flows into the combustion gas flow path 99. The compressed air inside the intermediate casing 16 further flows into the combustion gas flow path 99 through the shroud fitting groove 83 at the positions of both ends of the outlet seal 60c in the circumferential direction Dc without passing through the stepped surfaces 93ac and 93bc.

Next, the actions and the effects of the outlet seal 60 of the present embodiment will be described.

In the outlet seal 60 of the present embodiment, the first lid members 101 are located at both the ends of the first recessed portion 85 in the circumferential direction Dc. Namely, the end opening 86 of the first recessed portion 85 is closed by the first lid member 101. For this reason, in the present embodiment, it is possible to prevent the compressed air inside the intermediate casing 16 from flowing into the first recessed portion 85 from both the ends of the first recessed portion 85 in the circumferential direction Dc through the side surface of the outlet flange 37 and through the side surface of the flange first groove side plate 62. Therefore, in the present embodiment, it is possible to suppress the amount of leakage by which the compressed air inside the intermediate casing 16 flows into the combustion gas flow path 99 through the first recessed portion 85.

The second lid members 102 are located at both the ends of the second recessed portion 87 in the circumferential direction Dc. Namely, the end opening 88 of the second recessed portion 87 is closed by the second lid member 102. For this reason, in the present embodiment, it is possible to prevent the compressed air inside the intermediate casing 16 and inside the second recessed portion 87 from flowing into the shroud fitting groove 83 through the side surface of the shroud groove bottom plate 75. Therefore, in the present embodiment, it is possible to suppress the amount of leakage by which the compressed air inside the intermediate casing 16 and inside the second recessed portion 87 flows into the combustion gas flow path 99 through the shroud fitting groove 83.

In addition, in the present embodiment, even when the compressed air existing inside the intermediate casing 16 and on the radial first side Dr1 with respect to the shroud second groove side plate 77 flows into the shroud fitting groove 83 through a side surface of the shroud second groove side plate 77, the compressed air passes through a gap between the first stepped surface 93a and the second stepped surface 93b. For this reason, in the present embodiment, it is possible to prevent the compressed air existing inside the intermediate casing 16 and on the radial first side Dr1 with respect to the shroud second groove side plate 77 from flowing into the shroud fitting groove 83. Therefore, in the present embodiment, it is possible to suppress the amount of leakage by which the compressed air existing inside the intermediate casing 16 and on the radial first side Dr1 with respect to the shroud second groove side plate 77 flows into the combustion gas flow path 99 through the shroud fitting groove 83.

As described above, in the present embodiment, it is possible to suppress the amount of leakage by which the compressed air inside the intermediate casing 16 flows into the combustion gas flow path 99 through the outlet seal 60. For this reason, in the present embodiment, it is possible to suppress a decrease in the flow rate of the compressed air flowing into the combustor 30, and it is possible to suppress a decrease in the efficiency of the gas turbine 10.

The gas path surface 72 of the outlet seal 60 in the present embodiment is in contact with the combustion gas G. In addition, since the combustion gas G can flow into the first recessed portion 85 of the outlet seal 60 from the combustion gas flow path 99, there is a possibility that the combustion gas G comes into contact with the first upstream side surface 63 and with the first recessed portion side surface 64 that defines the first recessed portion 85. For this reason, in the present embodiment, the gas path surface 72, the first upstream side surface 63, and the first recessed portion side surface 64 of the outlet seal 60 are formed of the thermal barrier coating 111, so that damage to these surfaces caused by the combustion gas G is suppressed.

Both the first upstream side surface 63 of the seal body 61 and the lid upstream side surface 106 of the first lid member 101 face the downstream side end surface 39 of the outlet flange 37 in the axial direction Da. Since the first upstream side surface 63 of the seal body 61 is located on the axial second side Da2 (axial downstream side Dad) with respect to the lid upstream side surface 106 of the first lid member 101, the first upstream side surface 63 cannot come into contact with the downstream side end surface 39 of the outlet flange 37. On the other hand, since the lid upstream side surface 106 of the first lid member 101 is located on the axial first side Da1 (axial upstream side Dau) with respect to the first upstream side surface 63 of the seal body 61, the lid upstream side surface 106 can come into contact with the downstream side end surface 39 of the outlet flange 37. For this reason, in the present embodiment, the lid upstream side surface 106 is formed of the abrasion resistant coating 112, so that abrasion of the lid upstream side surface 106 is suppressed. As described above, both the end portions of the downstream side end surface 39 of the outlet flange 37 in the circumferential direction Dc, namely, portions facing the lid upstream side surface 106 of the first lid member 101 are formed of the abrasion resistant coating 112.

As described above, in the present embodiment, the lid members 100 are provided at both ends of all the recessed portions 84 in the circumferential direction Dc. However, the lid member 100 may be provided only at both ends of one recessed portion 84 in the circumferential direction Dc among the plurality of recessed portions 84.

ADDITIONAL NOTES

For example, the outlet seal in the above embodiment is understood as follows.

(1) According to a first aspect, there is provided an outlet seal 60 that connects an outlet flange 37 of a combustor 30 and a shroud 53i of a stator vane 50 of a turbine 40, the outlet seal 60 including: a seal body 61 extending in a circumferential direction Dc with respect to an axis Ar; and a lid member 100 provided at an end of the seal body 61 in the circumferential direction Dc to extend in an axial direction Da in which the axis Ar extends and in a radial direction Dr with respect to the axis Ar. The seal body 61 includes a combustor connecting portion 80 that is formed on an axial first side Da1 of the seal body 61 and that is connected to the outlet flange 37, the axial first side Da1 being one side in the axial direction Da, a stator vane connecting portion 82 that is formed on an axial second side Da2 of the seal body 61 and that is connected to the shroud 53i, the axial second side Da2 being the other side in the axial direction Da, and one or more recessed portions 84 recessed in the radial direction Dr or in the axial direction Da and extending in the circumferential direction Dc. The lid member 100 is disposed at a position of an end of at least one recessed portion 84 of the one or more recessed portions 84 in the circumferential direction Dc to overlap recessed spaces 85s and 87s in the axial direction Da and in the radial direction Dr, the recessed spaces 85s and 87s being formed by the one recessed portion 84.

In this aspect, since the lid member 100 is disposed at the end of the recessed portion 84 in the circumferential direction Dc, it is possible to suppress the amount of compressed air entering the recessed spaces 85s and 87s from the end of the recessed portion 84 in the circumferential direction Dc and exiting therefrom. For this reason, in this aspect, it is possible to suppress the amount of leakage by which the compressed air existing in a radial first side Dr1 of the outlet seal 60 flows into a combustion gas flow path 99 through the recessed spaces 85s and 87s of the recessed portion 84.

(2) According to a second aspect, in the outlet seal 60 of the first aspect, the seal body 61 includes a flange first groove side plate 62 extending in the circumferential direction Dc and in the radial direction Dr, a flange groove bottom plate 67 extending in the circumferential direction Dc and extending from an end on a radial first side Dr1 of the flange first groove side plate 62 toward the axial first side Da1, the radial first side Dr1 being one side in the radial direction Dr, and a flange second groove side plate 68 extending in the circumferential direction Dc and extending from an end on the axial first side Da1 of the flange groove bottom plate 67 toward a radial second side Dr2 that is the other side in the radial direction Dr. The flange first groove side plate 62, the flange groove bottom plate 67, and the flange second groove side plate 68 form a flange fitting groove 81 recessed to the radial first side Dr1 and extending in the circumferential direction Dc. The combustor connecting portion 80 includes the flange first groove side plate 62, the flange groove bottom plate 67, and the flange second groove side plate 68.

(3) According to a third aspect, in the outlet seal 60 of the second aspect, the flange first groove side plate 62 includes a first recessed portion 85 of the one or more recessed portions 84 in a radial second side region including an end on the radial second side Dr2 of the flange first groove side plate 62, the first recessed portion 85 being recessed toward the axial second side Da2 and extending in the circumferential direction Dc. The lid member 100 includes a first lid member 101 disposed at a position of an end of the first recessed portion 85 in the circumferential direction Dc to overlap a first recessed space 85s in the axial direction Da and in the radial direction Dr, the first recessed space 85s being formed by the first recessed portion 85.

In this aspect, the first lid member 101 is disposed at the end of the first recessed portion 85 in the circumferential direction Dc. For this reason, in this aspect, it is possible to prevent the compressed air existing on the radial first side Dr1 of the outlet seal 60 from flowing into the recessed space 85s of the first recessed portion 85 from the end of the first recessed portion 85 in the circumferential direction Dc through a side surface of the outlet flange 37 and through a side surface of the flange first groove side plate 62.

Therefore, in this aspect, it is possible to suppress the amount of leakage by which the compressed air existing on the radial first side Dr1 of the outlet seal 60 flows into the combustion gas flow path 99 through the first recessed portion 85.

(4) According to a fourth aspect, in the outlet seal 60 of the third aspect, the flange first groove side plate 62 has a first upstream side surface 63 and a second upstream side surface 65. The first upstream side surface 63 faces the axial first side Da1, and extends from the end on the radial second side Dr2 of the flange first groove side plate 62 toward the radial first side Dr1. The second upstream side surface 65 faces the axial first side Da1, and extends in the radial direction Dr on the radial first side Dr1 with respect to the first upstream side surface 63 and on the axial first side Da1 with respect to the first upstream side surface 63. The first upstream side surface 63 forms a bottom surface 89 of the first recessed portion 85.

(5) According to a fifth aspect, in the outlet seal 60 of the fourth aspect, the first lid member 101 extends toward the axial first side Da1 from the bottom surface 89 of the first recessed portion 85 to a position of the second upstream side surface 65 in the axial direction Da.

(6) According to a sixth aspect, in the outlet seal 60 of the fourth or fifth aspect, the first upstream side surface 63 is formed of a thermal barrier coating 111.

Combustion gas G can flow into the recessed space 85s of the first recessed portion 85 from the combustion gas flow path 99.

In this aspect, since the first upstream side surface 63 forming the bottom surface 89 of the first recessed portion 85 is formed of the thermal barrier coating 111, the thermal barrier property of the first upstream side surface 63 can be enhanced.

(7) According to a seventh aspect, in the outlet seal 60 of the fourth or fifth aspect, the first upstream side surface 63 is formed of a thermal barrier coating 111. A lid upstream side surface 106 of the first lid member 101 facing the axial first side Da1 is not formed of the thermal barrier coating 111.

Combustion gas G can flow into the recessed space 85s of the first recessed portion 85 from the combustion gas flow path 99.

In this aspect, since the first upstream side surface 63 forming the bottom surface 89 of the first recessed portion 85 is formed of the thermal barrier coating 111, the thermal barrier property of the first upstream side surface 63 can be enhanced.

(8) According to an eighth aspect, in the outlet seal 60 of any one of the fourth to seventh aspects, a lid upstream side surface 106 of the first lid member 101 facing the axial first side Da1 is formed of an abrasion resistant coating 112.

Both the first upstream side surface 63 of the seal body 61 and the lid upstream side surface 106 of the first lid member 101 face the downstream side end surface 39 of the outlet flange 37 in the axial direction Da. Since the first upstream side surface 63 of the seal body 61 is located on the axial second side Da2 (axial downstream side Dad) with respect to the lid upstream side surface 106 of the first lid member 101, the first upstream side surface 63 cannot come into contact with the downstream side end surface 39 of the outlet flange 37. On the other hand, since the lid upstream side surface 106 of the first lid member 101 is located on the axial first side Da1 (axial upstream side Dau) with respect to the first upstream side surface 63 of the seal body 61, the lid upstream side surface 106 can come into contact with the downstream side end surface 39 of the outlet flange 37. For this reason, in this aspect, the lid upstream side surface 106 is formed of the abrasion resistant coating 112, so that abrasion of the lid upstream side surface 106 is suppressed.

(9) According to a ninth aspect, in the outlet seal 60 of the fourth or fifth aspect, the first upstream side surface 63 is formed of a thermal barrier coating 111. A lid upstream side surface 106 of the first lid member 101 facing the axial first side Da1 is formed of an abrasion resistant coating 112. The thermal barrier coating 111 has a thermal barrier property higher than a thermal barrier property of the abrasion resistant coating 112. The abrasion resistant coating 112 has an abrasion resistance higher than an abrasion resistance of the thermal barrier coating 111.

Combustion gas G can flow into the recessed space 85s of the first recessed portion 85 from the combustion gas flow path 99.

In this aspect, since the first upstream side surface 63 forming the bottom surface 89 of the first recessed portion 85 is formed of the thermal barrier coating 111, the thermal barrier property of the first upstream side surface 63 can be enhanced.

Both the first upstream side surface 63 of the seal body 61 and the lid upstream side surface 106 of the first lid member 101 face the downstream side end surface 39 of the outlet flange 37 in the axial direction Da. Since the first upstream side surface 63 of the seal body 61 is located on the axial second side Da2 (axial downstream side Dad) with respect to the lid upstream side surface 106 of the first lid member 101, the first upstream side surface 63 cannot come into contact with the downstream side end surface 39 of the outlet flange 37. On the other hand, since the lid upstream side surface 106 of the first lid member 101 is located on the axial first side Da1 (axial upstream side Dau) with respect to the first upstream side surface 63 of the seal body 61, the lid upstream side surface 106 can come into contact with the downstream side end surface 39 of the outlet flange 37. For this reason, in this aspect, the lid upstream side surface 106 is formed of the abrasion resistant coating 112, so that abrasion of the lid upstream side surface 106 is suppressed.

(10) According to a tenth aspect, in the outlet seal 60 of any one of the second to ninth aspects, the seal body 61 includes a shroud first groove side plate 71 extending in the circumferential direction Dc and extending from the end on the radial second side Dr2 of the flange first groove side plate 62 toward the axial second side Da2, a shroud groove bottom plate 75 extending in the circumferential direction Dc and extending from an intermediate portion of the shroud first groove side plate 71 in the axial direction Da toward the radial first side Dr1, and a shroud second groove side plate 77 extending in the circumferential direction Dc and extending from an end on the radial first side Dr1 of the shroud groove bottom plate 75 toward the axial second side Da2. The shroud first groove side plate 71, the shroud groove bottom plate 75, and the shroud second groove side plate 77 form a shroud fitting groove 83 recessed to the axial first side Da1 and extending in the circumferential direction Dc. The stator vane connecting portion 82 includes the shroud first groove side plate 71, the shroud groove bottom plate 75, and the shroud second groove side plate 77.

(11) According to an eleventh aspect, in the outlet seal 60 of the first aspect, the seal body 61 includes a flange first groove side plate 62 extending in the circumferential direction Dc and in the radial direction Dr, a shroud first groove side plate 71 extending in the circumferential direction Dc and extending from an end on a radial second side Dr2 of the flange first groove side plate 62 toward the axial second side Da2, the radial second side Dr2 being the other side out of one side and the other side in the radial direction Dr, a shroud groove bottom plate 75 extending in the circumferential direction Dc and extending from an intermediate portion of the shroud first groove side plate 71 in the axial direction Da toward a radial first side Dr1 that is the one side in the radial direction Dr, and a shroud second groove side plate 77 extending in the circumferential direction Dc and extending from an end on the radial first side Dr1 of the shroud groove bottom plate 75 toward the axial second side Da2. The shroud first groove side plate 71, the shroud groove bottom plate 75, and the shroud second groove side plate 77 form a shroud fitting groove 83 recessed to the axial first side Da1 and extending in the circumferential direction Dc. The stator vane connecting portion 82 includes the shroud first groove side plate 71, the shroud groove bottom plate 75, and the shroud second groove side plate 77.

(12) According to a twelfth aspect, in the outlet seal 60 of the tenth or eleventh aspect, the flange first groove side plate 62, the shroud first groove side plate 71, and the shroud groove bottom plate 75 define a second recessed portion 87 of the one or more recessed portions 84, the second recessed portion 87 being recessed toward the radial second side Dr2 and extending in the circumferential direction Dc. The lid member 100 includes a second lid member 102 disposed at a position of an end of the second recessed portion 87 in the circumferential direction Dc to overlap a second recessed space 87s in the axial direction Da and in the radial direction Dr, the second recessed space 87 being formed by the second recessed portion 87s.

In this aspect, the second lid member 102 is disposed at the end of the second recessed portion 87 in the circumferential direction Dc. For this reason, in this aspect, it is possible to prevent the compressed air on the radial first side Dr1 of the outlet seal 60 and in the recessed space 87s of the second recessed portion 87 from flowing into the shroud fitting groove 83 through a side surface of the shroud groove bottom plate 75. Therefore, in this aspect, it is possible to suppress the amount of leakage by which the compressed air on the radial first side Dr1 of the outlet seal 60 and in the recessed space 87s of the second recessed portion 87 flows into the combustion gas flow path 99 through the shroud fitting groove 83.

(13) According to a thirteenth aspect, in the outlet seal 60 of the twelfth aspect, the second lid member 102 extends toward the radial first side Dr1 from a bottom surface 89 of the second recessed portion 87 to a position on the radial first side Dr1 with respect to a position of the shroud fitting groove 83 in the radial direction Dr.

(14) According to a fourteenth aspect, in the outlet seal 60 of the twelfth or thirteenth aspect, the seal body 61 has side surfaces 90a and 90b facing the circumferential direction Dc. The side surfaces 90a and 90b have flow path side surfaces 91a 91b formed on the radial second side Dr2 from a step position Ps on the seal body 61 in the radial direction Dr, and counter-flow path side surface 92a and 92b formed on the radial first side Dr1 from the step position Ps. Positions of the counter-flow path side surfaces 92a and 92b in the circumferential direction Dc are different from positions of the flow path side surface 91a and 91b in the circumferential direction Dc. The step position Ps is a position on the radial first side Dr1 with respect to the shroud fitting groove 83.

In this aspect, even when the compressed air existing on the radial first side Dr1 with respect to the shroud second groove side plate 77 flows into the shroud fitting groove 83, the compressed air passes through a gap between stepped surfaces 93a and 93b which connect the flow path side surfaces 91a and 91b and the counter-flow path side surfaces 92a and 92b and at which the step position Ps is located. For this reason, in this aspect, it is possible to prevent the compressed air existing on the radial first side Dr1 with respect to the shroud second groove side plate 77 from flowing into the shroud fitting groove 83. Therefore, in this aspect, it is possible to suppress the amount of leakage by which the compressed air existing on the radial first side Dr1 with respect to the shroud second groove side plate 77 flows into the combustion gas flow path 99 through the shroud fitting groove 83.

(15) According to a fifteenth aspect, in the outlet seal 60 of the fourteenth aspect, the second lid member 102 has lid side surfaces 103a and 103b that face the circumferential direction Dc and that are continuous with the side surfaces 90a and 90b of the seal body 61. The lid side surfaces 103a and 103b have lid flow path side surfaces 104a and 104b that are formed on the radial second side Dr2 from the step position Ps and that are continuous with the flow path side surfaces 91a and 91b, and lid counter-flow path side surfaces 105a and 105b that are formed on the radial first side Dr1 from the step position Ps and that are continuous with the counter-flow path side surfaces 92a and 92b.

In addition, for example, a gas turbine in the above embodiment is understood as follows.

(16) A gas turbine according to a sixteenth aspect includes the outlet seal 60 of any one of the first to fifteenth aspects; the combustor 30; and the turbine 40. The combustor 30 includes a combustion tube 35 extending in a direction including a directional component of the axial direction Da, a burner 31 that sprays fuel into a combustion space 34 that is a space on an inner peripheral side of the combustion tube 35, and the outlet flange 37 extending from an end on the axial second side Da2 of the combustion tube 35 in the radial direction Dr. The turbine 40 includes a turbine rotor 41 that rotates around the axis Ar, a turbine casing 45 covering the turbine rotor 41, and a plurality of stator vane rows 46 attached to the turbine casing 45. The turbine rotor 41 includes a rotor shaft 42 around the axis Ar and a plurality of rotor blade rows 43 attached to the rotor shaft 42. The plurality of rotor blade rows 43 are arranged in the axial direction Da. Each of the plurality of stator vane rows 46 is disposed on the axial first side Da1 with respect to one rotor blade row 43 of the plurality of rotor blade rows 43. Each of the plurality of stator vane rows 46 includes a plurality of stator vanes 46a arranged in the circumferential direction Dc. Each of the plurality of stator vanes 46a includes a vane body 51 extending in the radial direction Dr and shrouds 53o and 53i formed at an end of the vane body 51 in the radial direction Dr. The outlet seal 60 connects the outlet flange 37 of the combustion tube 35 and the shrouds 53o and 53i of a first stage stator vane 50 provided in a first stage stator vane row on a most axial first side Da1 among the plurality of stator vane rows 46.

INDUSTRIAL APPLICABILITY

According to the outlet seal of one aspect of the present disclosure, it is possible to suppress the amount of leakage of the compressed air into the combustion gas flow path.

REFERENCE SIGNS LIST

10: Gas turbine
11: Gas turbine rotor

15: Gas turbine casing
16: Intermediate casing
20: Compressor
21: Compressor rotor
22: Rotor shaft
23: Rotor blade row
23a: Rotor blade
25: Compressor casing
26: Stator vane row
26a: Stator vane
30: Combustor
31: Burner
32: Burner frame
34: Combustion space
35: Combustion tube
36: Cylinder
37: Outlet flange
37i: Inner flange
37o: Outer flange
37p: Pin hole
38: Gas path surface
39: Downstream side end surface
40: Turbine
41: Turbine rotor
42: Rotor shaft
43: Rotor blade row
43a: Rotor blade
45: Turbine casing
46: Stator vane row
46a: Stator vane
49: Combustion gas flow path
50: Stator vane (first stage stator vane)
51: Vane body
53o: Outer shroud
53i: Inner shroud (or simply shroud)
60, 60c: Outlet seal
60i: Inner outlet seal
60o: Outer outlet seal
61: Seal body
62: Flange first groove side plate
62p: Pin hole
63: First upstream side surface
64: First recessed portion side surface
65: Second upstream side surface
67: Flange groove bottom plate
68: Flange second groove side plate
68p: Pin hole
69: Pin
71: Shroud first groove side plate
72: Gas path surface
73: Counter-gas path surface
75: Shroud groove bottom plate
77: Shroud second groove side plate
80: Combustor connecting portion
81: Flange fitting groove
82: Stator vane connecting portion
83: Shroud fitting groove
84: Recessed portion
85: First recessed portion
85s: Recessed space
86: End opening
87: Second recessed portion
87s: Recessed space
88: End opening
89: Bottom surface
90a: First side surface
90b: Second side surface
91a: First flow path side surface
91b: Second flow path side surface
92a: First counter-flow path side surface
92b: Second counter-flow path side surface
93a, 93ac: First stepped surface
93b, 93bc: Second stepped surface
99: Combustion gas flow path
100: Lid member
101: First lid member
102: Second lid member
103a: First lid side surface
103b: Second lid side surface
104a: First lid flow path side surface
104b: Second lid flow path side surface
105a: First lid counter-flow path side surface
105b: Second lid counter-flow path side surface
106: Lid upstream side surface
110: Base material
111: Thermal barrier coating
112: Abrasion resistant coating
A: Air
F: Fuel
G: Combustion gas
Ps, Psc: Step position
Ar: Axis
Ca: Combustor axis
Da: Axial direction
Dau: Axial upstream side
Dad: Axial downstream side
Da1: Axial first side
Da2: Axial second side
Dc: Circumferential direction
Dc1: Circumferential first side
Dc2: Circumferential second side
Dr: Radial direction
Dri: Radial inner side
Dro: Radial outer side
Dr1: Radial first side
Dr2: Radial second side

The invention claimed is:

1. An outlet seal that connects an outlet flange of a combustor and a shroud of a stator vane of a turbine, the seal comprising:
  a seal body extending in a circumferential direction with respect to an axis; and
  a lid member provided at an end of the seal body in the circumferential direction to extend in an axial direction in which the axis extends and in a radial direction with respect to the axis, wherein
  the seal body includes
    a combustor connecting portion that is formed on an axial first side of the seal body and that is connected to the outlet flange, the axial first side being one side in the axial direction,
    a stator vane connecting portion that is formed on an axial second side of the seal body and that is connected to the shroud, the axial second side being the other side in the axial direction, and
    one or more recessed portions recessed in the radial direction or in the axial direction and extending in the circumferential direction,
  an end of the one or more recessed portions in the circumferential direction has an end opening,
  the lid member is disposed at a position of an end of at least one recessed portion of the one or more recessed portions in the circumferential direction to overlap a recessed space in the axial direction and in the radial direction, the recessed space being formed by the at least one recessed portion, the end opening is covered by a part of the lid member, and the lid member is integrally formed with the seal body.

2. The outlet seal according to claim 1, wherein the seal body includes
- a flange first groove side plate extending in the circumferential direction and in the radial direction,
- a flange groove bottom plate extending in the circumferential direction and extending from an end on a radial first side of the flange first groove side plate toward the axial first side, the radial first side being one side in the radial direction, and
- a flange second groove side plate extending in the circumferential direction and extending from an end on the axial first side of the flange groove bottom plate toward a radial second side that is the other side in the radial direction, the flange first groove side plate, the flange groove bottom plate, and the flange second groove side plate form a flange fitting groove recessed to the radial first side and extending in the circumferential direction, and the combustor connecting portion includes the flange first groove side plate, the flange groove bottom plate, and the flange second groove side plate.

3. The outlet seal according to claim 2, wherein the flange first groove side plate includes a first recessed portion of the one or more recessed portions in a radial second side region including an end on the radial second side of the flange first groove side plate, the first recessed portion being recessed toward the axial second side and extending in the circumferential direction, and the lid member includes a first lid member disposed at a position of an end of the first recessed portion in the circumferential direction to overlap a first recessed space in the axial direction and in the radial direction, the first recessed space being formed by the first recessed portion.

4. The outlet seal according to claim 2, wherein the seal body includes
- a shroud first groove side plate extending in the circumferential direction and extending from an end on the radial second side of the flange first groove side plate toward the axial second side,
- a shroud groove bottom plate extending in the circumferential direction and extending from an intermediate portion of the shroud first groove side plate in the axial direction toward the radial first side, and
- a shroud second groove side plate extending in the circumferential direction and extending from an end on the radial first side of the shroud groove bottom plate toward the axial second side, the shroud first groove side plate, the shroud groove bottom plate, and the shroud second groove side plate form a shroud fitting groove recessed to the axial first side and extending in the circumferential direction, and the stator vane connecting portion includes the shroud first groove side plate, the shroud groove bottom plate, and the shroud second groove side plate.

5. The outlet seal according to claim 4, wherein the flange first groove side plate, the shroud first groove side plate, and the shroud groove bottom plate define a second recessed portion of the one or more recessed portions, the second recessed portion being recessed toward the radial second side and extending in the circumferential direction, and the lid member includes a second lid member disposed at a position of an end of the second recessed portion in the circumferential direction to overlap a second recessed space in the axial direction and in the radial direction, the second recessed space being formed by the second recessed portion.

6. The outlet seal according to claim 1, wherein the seal body includes
- a flange first groove side plate extending in the circumferential direction and in the radial direction,
- a shroud first groove side plate extending in the circumferential direction and extending from an end on a radial second side of the flange first groove side plate toward the axial second side, the radial second side being the other side out of one side and the other side in the radial direction,
- a shroud groove bottom plate extending in the circumferential direction and extending from an intermediate portion of the shroud first groove side plate in the axial direction toward a radial first side that is the one side in the radial direction, and
- a shroud second groove side plate extending in the circumferential direction and extending from an end on the radial first side of the shroud groove bottom plate toward the axial second side, the shroud first groove side plate, the shroud groove bottom plate, and the shroud second groove side plate form a shroud fitting groove recessed to the axial first side and extending in the circumferential direction, and the stator vane connecting portion includes the shroud first groove side plate, the shroud groove bottom plate, and the shroud second groove side plate.

7. A gas turbine comprising:

the outlet seal according to claim 1;

the combustor; and the turbine, wherein the combustor includes a combustion tube extending in a direction including a directional component of the axial direction, a burner that sprays fuel into a combustion space that is a space on an inner peripheral side of the combustion tube, and the outlet flange extending from an end on the axial second side of the combustion tube in the radial direction, the turbine includes a turbine rotor that rotates around the axis, a turbine casing covering the turbine rotor, and a plurality of stator vane rows attached to the turbine casing, the turbine rotor includes a rotor shaft around the axis and a plurality of rotor blade rows attached to the rotor shaft, the plurality of rotor blade rows are arranged in the axial direction, each of the plurality of stator vane rows is disposed on the axial first side with respect to one rotor blade row of the plurality of rotor blade rows, each of the plurality of stator vane rows includes a plurality of stator vanes arranged in the circumferential direction, each of the plurality of stator vanes includes a vane body extending in the radial direction and a shroud formed at an end of the vane body in the radial direction, and the outlet seal connects the outlet flange of the combustion tube and a shroud of a first stage stator vane provided in a first stage stator vane row on a most axial first side among the plurality of stator vane rows.

8. An outlet seal that connects an outlet flange of a combustor and a shroud of a stator vane of a turbine, the seal comprising:
- a seal body extending in a circumferential direction with respect to an axis; and
- a lid member provided at an end of the seal body in the circumferential direction to extend in an axial direction in which the axis extends and in a radial direction with respect to the axis, wherein the seal body includes
- a combustor connecting portion that is formed on an axial first side of the seal body and that is connected to the outlet flange, the axial first side being one side in the axial direction,
- a stator vane connecting portion that is formed on an axial second side of the seal body and that is connected to the shroud, the axial second side being the other side in the axial direction, and
- one or more recessed portions recessed in the radial direction or in the axial direction and extending in the circumferential direction, the combustor connecting portion includes
- a flange first groove side plate extending in the circumferential direction and in the radial direction,
- a flange groove bottom plate extending in the circumferential direction and extending from an end on a radial first side of the flange first groove side plate toward the axial first side, the radial first side being one side in the radial direction, and
- a flange second groove side plate extending in the circumferential direction and extending from an end on the axial first side of the flange groove bottom plate toward a radial second side that is the other side in the radial direction, the flange first groove side plate, the flange groove bottom plate, and the flange second groove side plate form a flange fitting groove recessed to the radial first side and extending in the circumferential direction, the lid member is disposed at a position of an end of at least one recessed portion of the one or more recessed portions in the circumferential direction to overlap a recessed space in the axial direction and in the radial direction, the recessed space being formed by the at least one recessed portion, the flange first groove side plate includes a first recessed portion of the one or more recessed portions in a radial second side region including an end on the radial second side of the flange first groove side plate, the first recessed portion being recessed toward the axial second side and extending in the circumferential direction, and the lid member includes a first lid member disposed at a position of an end of the first recessed portion in the circumferential direction to overlap a first recessed space in the axial direction and in the radial direction, the first recessed space being formed by the first recessed portion.

9. The outlet seal according to claim 8, wherein
the flange first groove side plate has a first upstream side surface and a second upstream side surface,
the first upstream side surface faces the axial first side and extends from the end on the radial second side of the flange first groove side plate toward the radial first side,
the second upstream side surface faces the axial first side and extends in the radial direction on the radial first side with respect to the first upstream side surface and on the axial first side with respect to the first upstream side surface, and the first upstream side surface forms a bottom surface of the first recessed portion.

10. The outlet seal according to claim 9, wherein
the first lid member extends toward the axial first side from the bottom surface of the first recessed portion to a position of the second upstream side surface in the axial direction.

11. The outlet seal according to claim 9, wherein
the first upstream side surface is formed of a thermal barrier coating.

12. The outlet seal according to claim 9, wherein
the first upstream side surface is formed of a thermal barrier coating, and
a lid upstream side surface of the first lid member facing the axial first side is not formed of the thermal barrier coating.

13. The outlet seal according to claim 9, wherein
a lid upstream side surface of the first lid member facing the axial first side is formed of an abrasion resistant coating.

14. The outlet seal according to claim 9, wherein
the first upstream side surface is formed of a thermal barrier coating,
a lid upstream side surface of the first lid member facing the axial first side is formed of an abrasion resistant coating,
the thermal barrier coating has a thermal barrier property higher than a thermal barrier property of the abrasion resistant coating, and
the abrasion resistant coating has an abrasion resistance higher than an abrasion resistance of the thermal barrier coating.

15. An outlet seal that connects an outlet flange of a combustor and a shroud of a stator vane of a turbine, the seal comprising:
- a seal body extending in a circumferential direction with respect to an axis; and
- a lid member provided at an end of the seal body in the circumferential direction to extend in an axial direction in which the axis extends and in a radial direction with respect to the axis, wherein the seal body includes
- a combustor connecting portion that is formed on an axial first side of the seal body and that is connected to the outlet flange, the axial first side being one side in the axial direction,
- a stator vane connecting portion that is formed on an axial second side of the seal body and that is connected to the shroud, the axial second side being the other side in the axial direction,
- one or more recessed portions recessed in the radial direction or in the axial direction and extending in the circumferential direction, and
- a flange first groove side plate extending in the circumferential direction and in the radial direction, the stator vane connecting portion includes
- a shroud first groove side plate extending in the circumferential direction and extending from an end on a radial second side of the flange first groove side plate toward the axial second side, the radial second side being the other side out of one side and the other side in the radial direction,
- a shroud groove bottom plate extending in the circumferential direction and extending from an intermediate portion of the shroud first groove side plate in the axial direction toward a radial first side that is the one side in the radial direction, and a shroud second groove side plate extending in the circumferential direction and extending from an end on the radial first side of the shroud groove bottom plate toward the axial second side, the shroud first groove side plate, the shroud groove bottom plate, and the shroud second groove side plate form a shroud fitting groove recessed to the axial first side and extending in the circumferential direction, the lid member is disposed at a position of an end of at least one recessed portion of the one or more recessed portions in the circumferential direction to overlap a recessed space in the axial direction and in the radial direction, the recessed space being formed by the at least one recessed portion, the flange first groove side plate, the shroud first groove side plate, and the shroud groove bottom plate define a second recessed portion of the one or more recessed portions, the second recessed portion being recessed toward the radial second side and extending in the circumferential direction, and the lid member includes a second lid member disposed at a position of an end of the second recessed portion in the circumferential direction to overlap a second recessed space in the axial direction and in the radial direction, the second recessed space being formed by the second recessed portion.

16. The outlet seal according to claim 15, wherein
the second lid member extends toward the radial first side from a bottom surface of the second recessed portion to a position on the radial first side with respect to a position of the shroud fitting groove in the radial direction.

17. The outlet seal according to claim 15, wherein
the seal body has a side surface facing the circumferential direction, the side surface has a flow path side surface formed on the radial second side from a step position on the seal body in the radial direction, and a counter-flow path side surface formed on the radial first side from the step position, a position of the counter-flow path side surface in the circumferential direction is different from a position of the flow path side surface in the circumferential direction, and the step position is located on the radial first side with respect to the shroud fitting groove.

18. The outlet seal according to claim 17, wherein
the second lid member has a lid side surface that faces the circumferential direction and that is continuous with the side surface of the seal body, and the lid side surface has a lid flow path side surface that is formed on the radial second side from the step position and that is continuous with the flow path side surface, and a lid counter-flow path side surface that is formed on the radial first side from the step position and that is continuous with the counter-flow path side surface.

* * * * *